United States Patent
Parizhsky et al.

(10) Patent No.: US 8,417,282 B2
(45) Date of Patent: Apr. 9, 2013

(54) METHODS AND APPARATUS FOR COMMUNICATING WITH MULTIPLE ANTENNAS

(75) Inventors: Vladimir Parizhsky, New York, NY (US); Junyi Li, Chester, NJ (US); Rajiv Laroia, Far Hills, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 897 days.

(21) Appl. No.: 12/491,878

(22) Filed: Jun. 25, 2009

(65) Prior Publication Data

US 2010/0330915 A1    Dec. 30, 2010

(51) Int. Cl.
H04M 1/00 (2006.01)
H04B 1/00 (2006.01)
H04B 15/00 (2006.01)

(52) U.S. Cl.
USPC .................. 455/550.1; 455/63.1; 455/501

(58) Field of Classification Search ............ 455/39, 455/501, 500, 63.1, 67.11, 67.13, 77, 550.1, 455/562.1, 101, 114.2, 115.1, 132, 296
See application file for complete search history.

(56) References Cited

U.S. PATENT DOCUMENTS

| | | | |
|---|---|---|---|
| 6,853,839 B2 * | 2/2005 | Usuda et al. | 455/276.1 |
| 8,064,502 B2 * | 11/2011 | Sawai et al. | 375/219 |
| 2002/0111191 A1 * | 8/2002 | Takatori et al. | 455/562 |
| 2002/0191580 A1 * | 12/2002 | Ishii et al. | 370/342 |
| 2004/0147289 A1 | 7/2004 | Paljug et al. | |
| 2004/0196805 A1 * | 10/2004 | Lee | 370/329 |
| 2006/0025178 A1 | 2/2006 | Tao et al. | |
| 2007/0004337 A1 * | 1/2007 | Biswas et al. | 455/63.1 |
| 2007/0160156 A1 * | 7/2007 | Melzer et al. | 375/260 |
| 2007/0259623 A1 * | 11/2007 | Tanaka et al. | 455/63.1 |
| 2007/0298718 A1 * | 12/2007 | Je et al. | 455/63.1 |
| 2008/0101497 A1 * | 5/2008 | Gaikwad et al. | 375/267 |
| 2009/0109850 A1 * | 4/2009 | Li et al. | 370/235 |
| 2009/0190684 A1 * | 7/2009 | She et al. | 375/267 |
| 2009/0239474 A1 * | 9/2009 | Kangas et al. | 455/67.13 |
| 2009/0270109 A1 * | 10/2009 | Wang Helmersson et al. | 455/453 |

FOREIGN PATENT DOCUMENTS

| | | |
|---|---|---|
| EP | 1715600 A1 | 10/2006 |
| EP | 1863191 A1 | 12/2007 |
| WO | WO02052749 | 7/2002 |

OTHER PUBLICATIONS

International Search Report and Written Opinion—PCT/US2010/039723—ISA—EPO—Nov. 2, 2010.

* cited by examiner

*Primary Examiner* — Andrew Wendell
(74) *Attorney, Agent, or Firm* — James O'Hare; Paul S. Holdaway

(57) ABSTRACT

Wireless communications methods and apparatus for a device using multiple antennas are described. A first wireless communications device receives signals from a second communications device. The first device generates receiver interference estimates corresponding to different antennas and selects one antenna to receive signals from the second device, as a function of the generated receiver interference estimates. The first device receives signals from one or more additional devices to which first device transmission may cause interference. The first device generates transmitter interference estimates corresponding to different antennas and selects one antenna to transmit signals to the second device as a function of the generated transmitter interference estimates. The first device may, and sometimes does, select different receive and transmit antennas for communicating with the second device.

23 Claims, 17 Drawing Sheets

| FIGURE 4A | FIGURE 4B |

METHODS AND APPARATUS FOR COMMUNICATING WITH MULTIPLE ANTENNAS

FIELD

Various embodiments relate to wireless communications, and more particularly, to methods and apparatus which can be used for communicating with multiple antennas.

BACKGROUND

Communications devices are often subject to interference from other devices in a communications system. Depending on the location of neighboring devices and their transmission activity, transmit and receive interference may vary and may be asymmetric.

Communications devices sometimes include multiple antennas. In such devices, antenna selection for sending signals to and receiving signals from another device is often made based on an interference measurement with the same antenna or set of antennas being used to transmit and receive signals when communicating with a particular device.

While interference detected by a device is of concern in terms of receive quality, in communications systems interference caused to other devices may also be of concern. Selecting an antenna to optimize received signal quality may result in excessive interference to a neighboring device when the antenna is used to transmit signals. Interference management is complicated in systems where there is decentralized control, e.g., peer to peer systems without a centralized system controller.

In view of the above discussion, it should be appreciated that there is a need for improved methods and/or apparatus for making a decision as to which antenna should be used for receiving and which, possibly different antenna, should be used for transmitting. It is desirable, in at least some embodiments, that antenna selection for transmit purposes take into consideration interference which may be caused to other devices.

SUMMARY

Methods and apparatus related to wireless communications involving a wireless communication device, using a plurality of antennas, are described. The different antennas of the wireless communications device in some embodiments are situated at different locations and/or are pointed in different directions. In accordance with one aspect, receive and transmit antenna selection is made in such a manner that a different antenna may be selected for receiving signals than transmitting signals even though the communication peer is the same for the received and transmitted signals. The transmit antenna selection may take into consideration interference caused to other devices.

Various described methods and apparatus are well suited to a peer to peer wireless communications system, e.g., a peer to peer communications system using a decentralized control approach in which at least some air link resources, e.g., time-frequency segments, may be, and sometimes are reused.

In some embodiments, a first wireless communications device, including or coupled to a plurality of antennas, receives a signal from a target device of interest. The first device generates receiver interference estimates corresponding to different potential antennas as a function of the received signal from the target device. The first device selects one antenna for use in receiving signals from the target device of interest, as a function of the generated receiver interference estimates. The first device further receives signals from one or more additional devices which will be subject to interference due to transmission from the first device to the target device of interest. The first device generates transmitter interference estimates corresponding to different potential antennas as a function of the received signals from the one or more additional devices. The first device selects one antenna to use to transmit signals to the target device of interest as a function of the generated transmitter interference estimates.

The first communications device may, and sometimes does, select different receive and transmit antennas corresponding to the same target device of interest, e.g., corresponding to an asymmetrical interference environment and/or corresponding to different receive and transmit antenna selection criteria. In some embodiments, the first communications device's selection of a receive and/or a transmit antenna corresponding to a target device of interest may, and sometimes does, change rapidly, e.g., from one peer to peer traffic slot to the next, as a function of a rapidly changing interference environment which is being tracked. In various embodiments, the first communications device, e.g., a peer to peer wireless communications device with multiple alternative available antennas, performs its receive and transmit antenna selections in an independent manner, e.g., without being controlled by another node.

An exemplary method of operating a first communications device in accordance with some embodiments comprises: generating receiver interference estimates for each of a plurality of antennas; selecting one of the plurality of antennas for receiving signals from a second communications device as a function of the receiver interference estimates; generating transmitter interference estimates for each of the plurality of antennas, the transmitter interference estimates estimating the interference to other devices which will be caused by transmission to the second communications device from the antenna to which the estimate corresponds; and selecting one of the plurality of antennas for transmitting signals to the second communications device as a function of one of the transmitter interference estimates. An exemplary first communications device, in accordance with some embodiments, comprises: at least one processor configured to: generate receiver interference estimates for each of a plurality of antennas; select one of the plurality of antennas for receiving signals from a second communications device as a function of the receiver interference estimates; generate transmitter interference estimates for each of the plurality of antennas, the transmitter interference estimates estimating the interference to other devices which will be caused by transmission to the second communications device from the antenna to which the estimate corresponds; and select one of the plurality of antennas for transmitting signals to the second communications device as a function of one of the transmitter interference estimates. The exemplary first communications device further comprises memory coupled to said at least one processor.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

Drawing 6 illustrates an example where a peer to peer access node receives signals from a peer to peer mobile node over a plurality of antennas and transmits to the peer to peer mobile node over a selected antenna.

Drawing 7 illustrates an example where a peer to peer access node including a plurality of antennas selects to use different antennas for receiving signals from and transmitting signals to a peer to peer mobile node.

Figure 8:
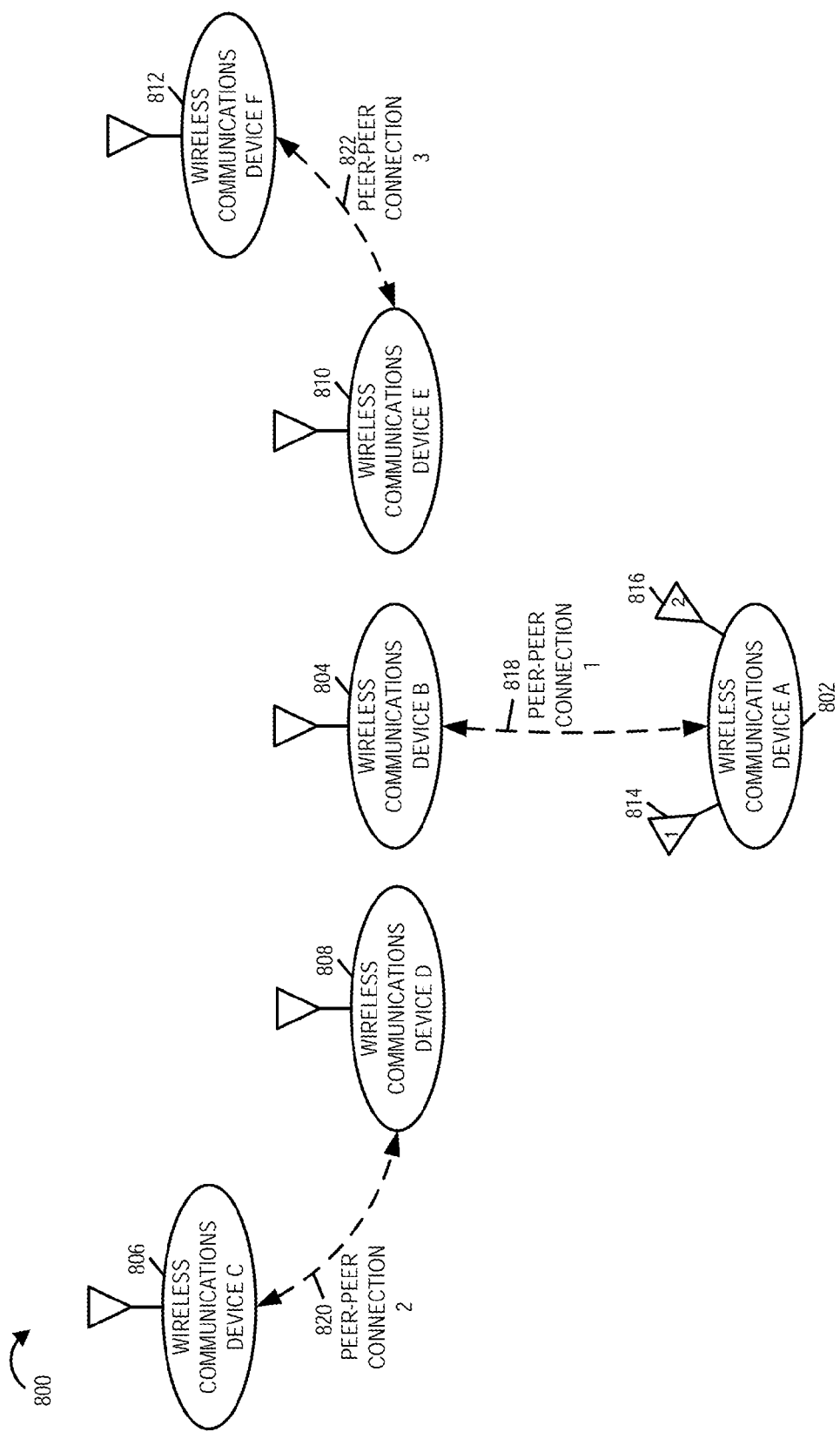

FIG. 8 is a drawing illustrating an exemplary peer to peer wireless communications system including a plurality of wireless communications devices.

Figure 9:
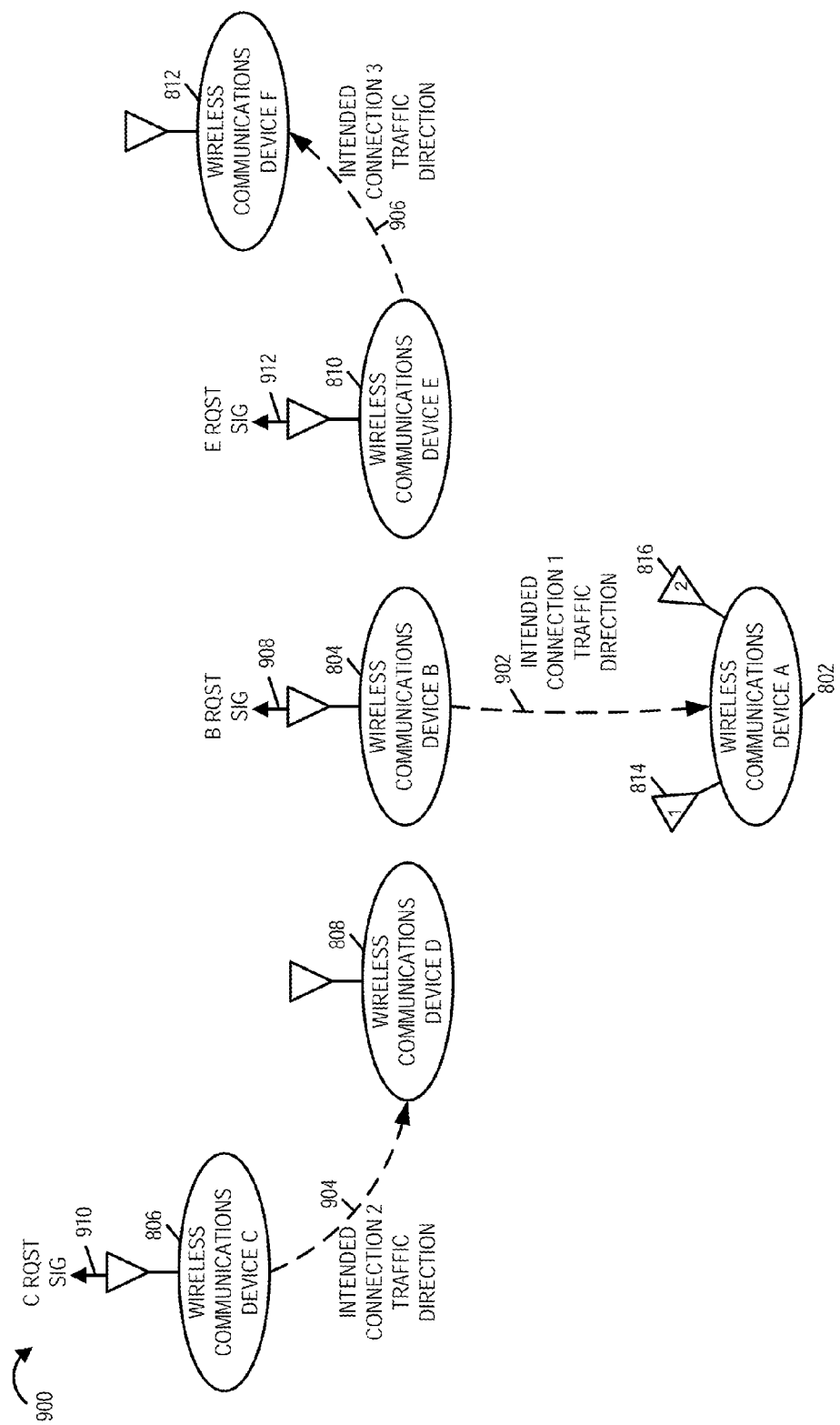

FIG. 9 is a drawing illustrating the system of FIG. 8 including exemplary intended traffic signaling directions and some exemplary control signaling used in generating receiver interference estimates.

Figure 10:
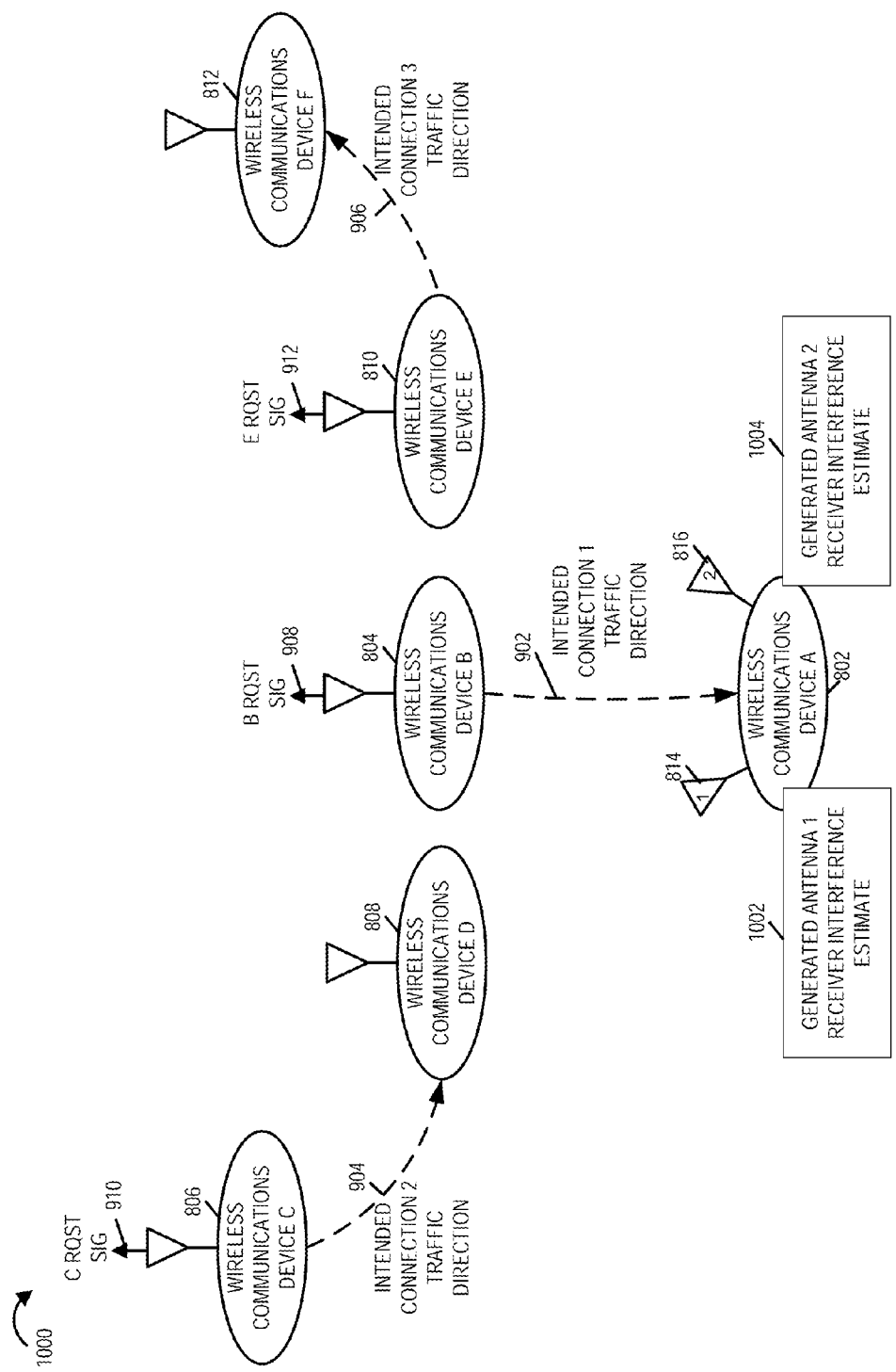

FIG. 10 is a drawing illustrating exemplary receiver interference estimates based on received signals described in FIG. 9.

Figure 11:
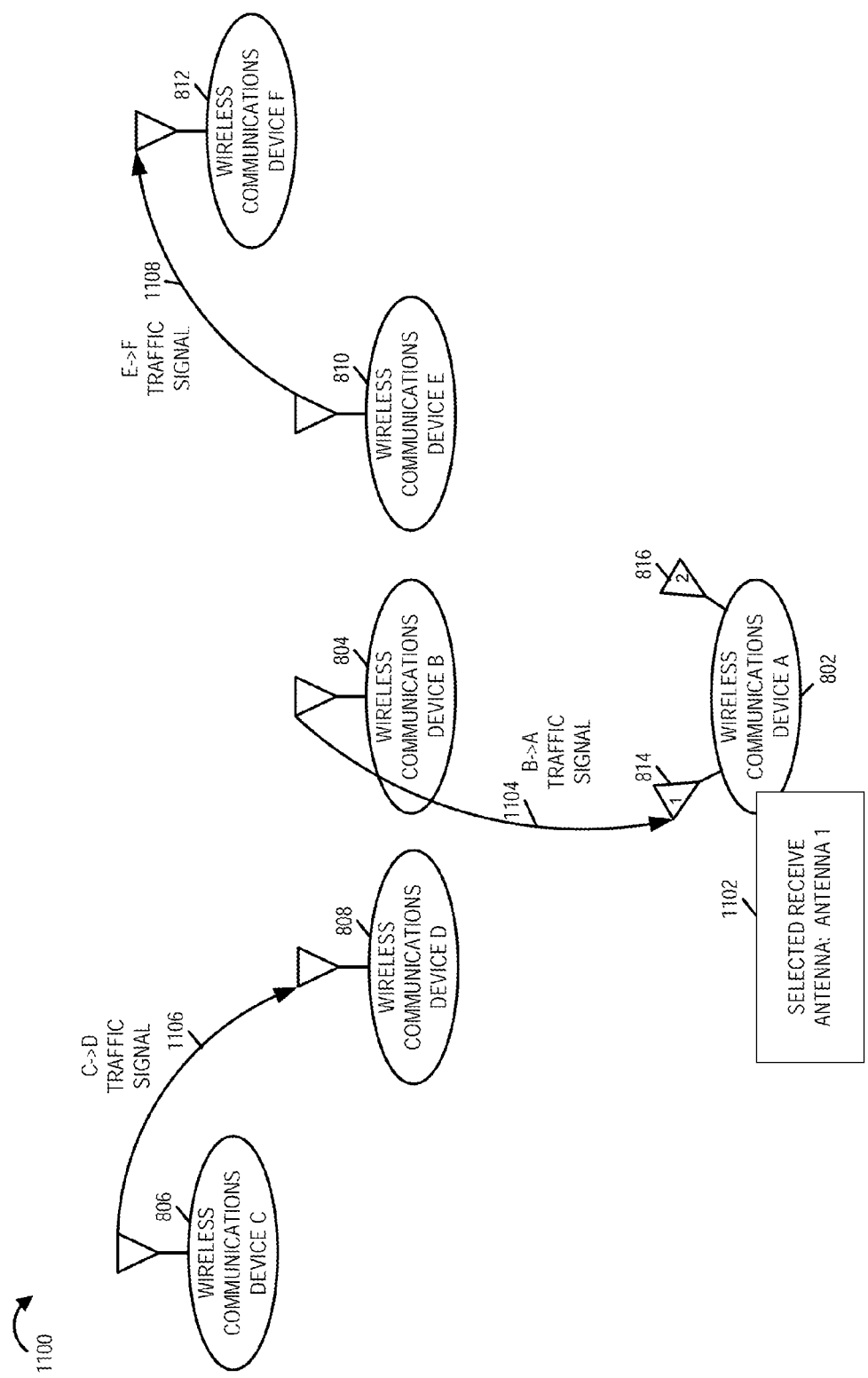

FIG. 11 is a drawing illustrating exemplary receive antenna selection based on the generated antenna receiver interference estimates of FIG. 10.

Figure 12:
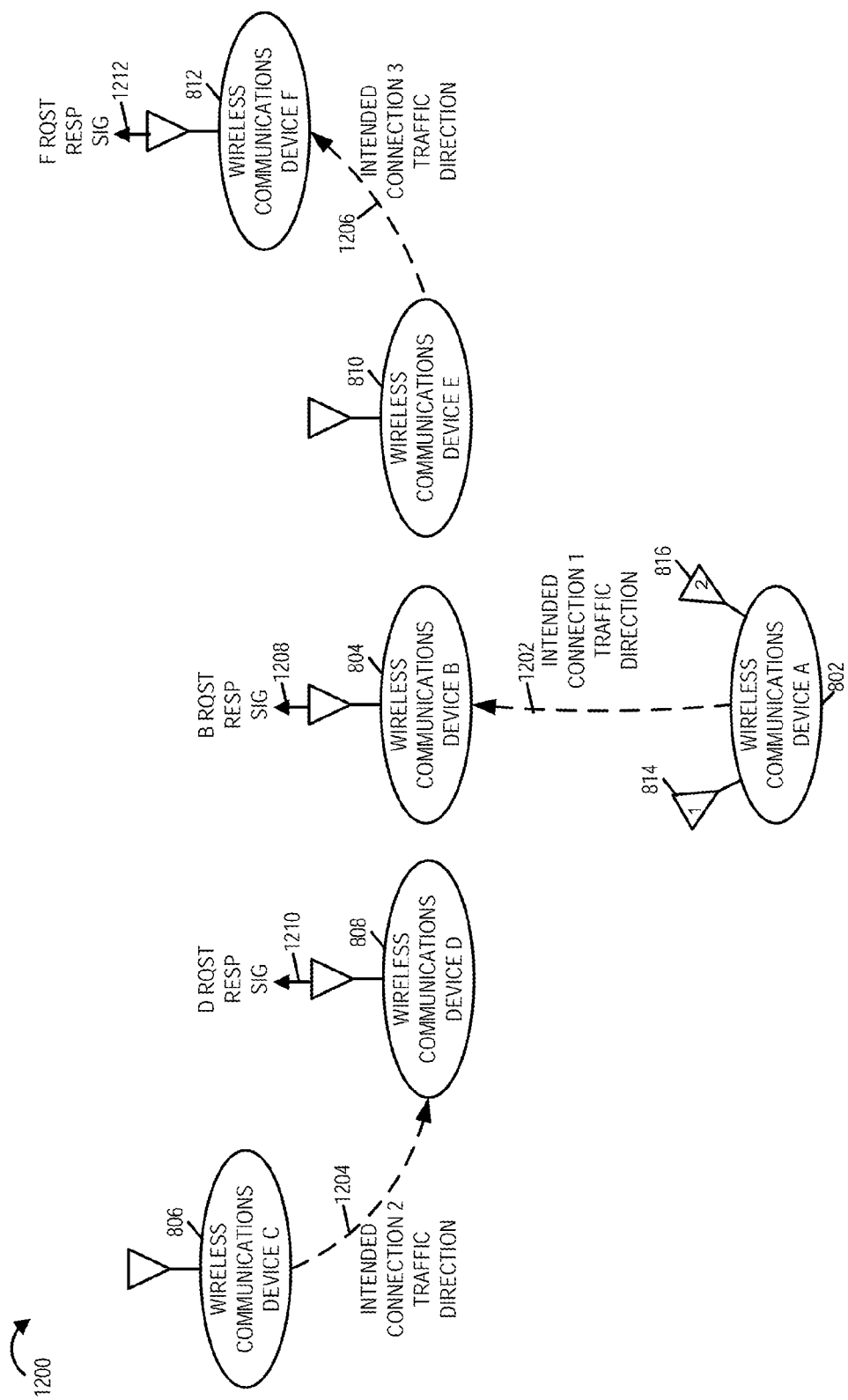

FIG. 12 is a drawing illustrating the system of FIG. 8 including exemplary intended traffic signaling directions and some exemplary control signaling used in generating transmitter interference estimates.

Figure 13:
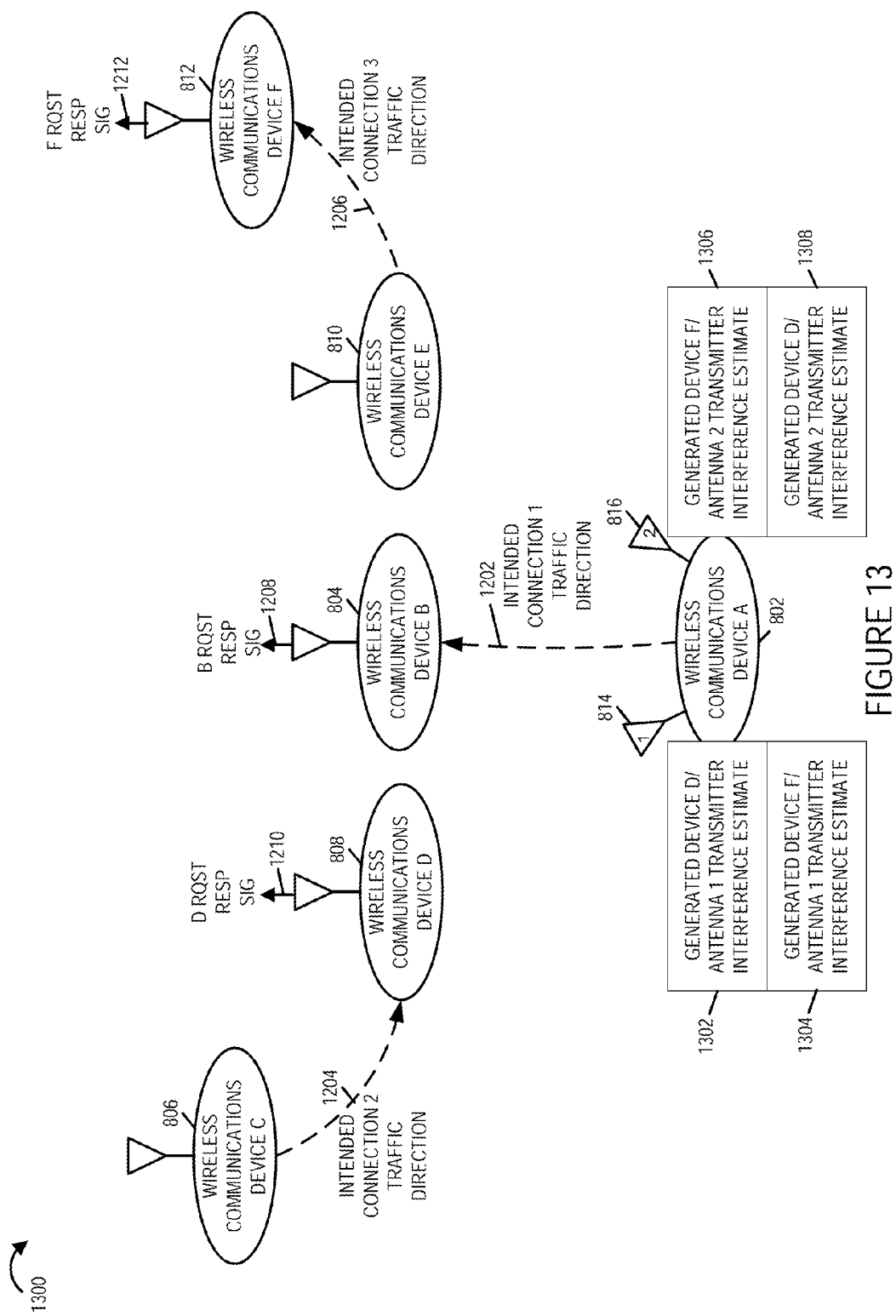

FIG. 13 is a drawing illustrating exemplary transmitter interference estimates based on received signals described in FIG. 12.

Figure 14:
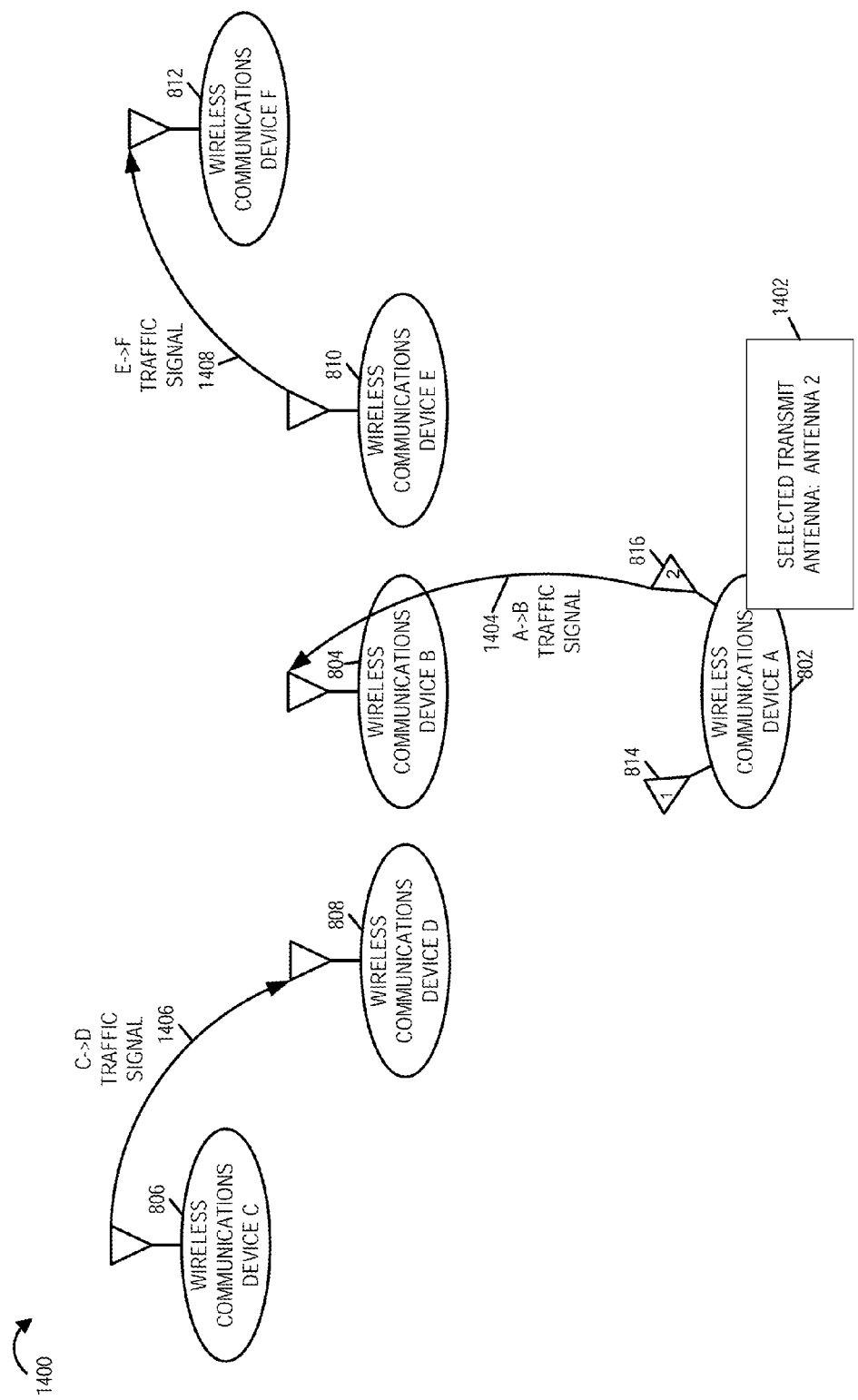

FIG. 14 is a drawing illustrating exemplary transmit antenna selection based on the generated antenna transmitter interference estimates of FIG. 13.

Figure 15:
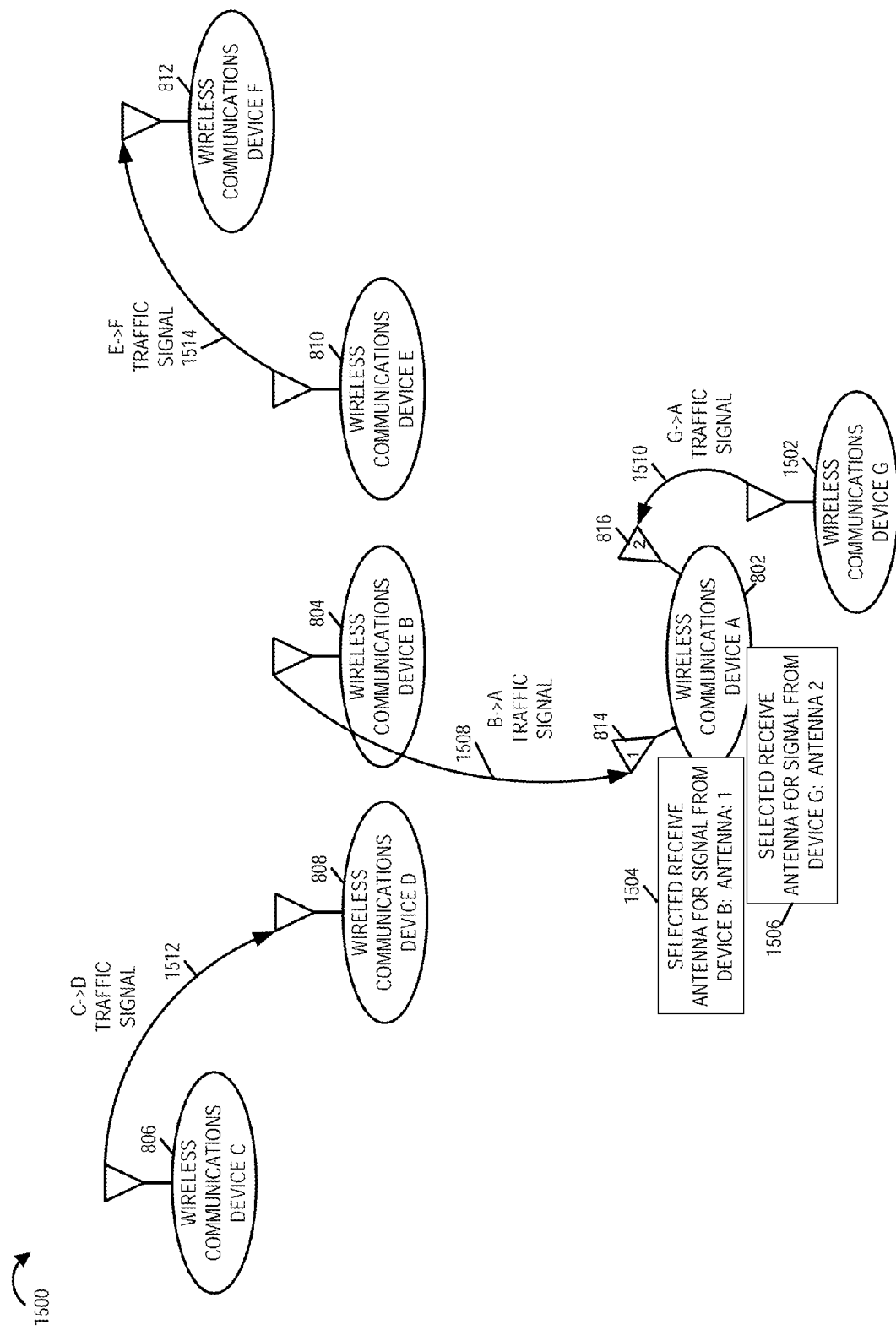

FIG. 15 illustrates an example, where a wireless communications device selects different antennas for receiving signals from two different wireless communications devices based on receiver interference estimates.

DETAILED DESCRIPTION

Figure 1:
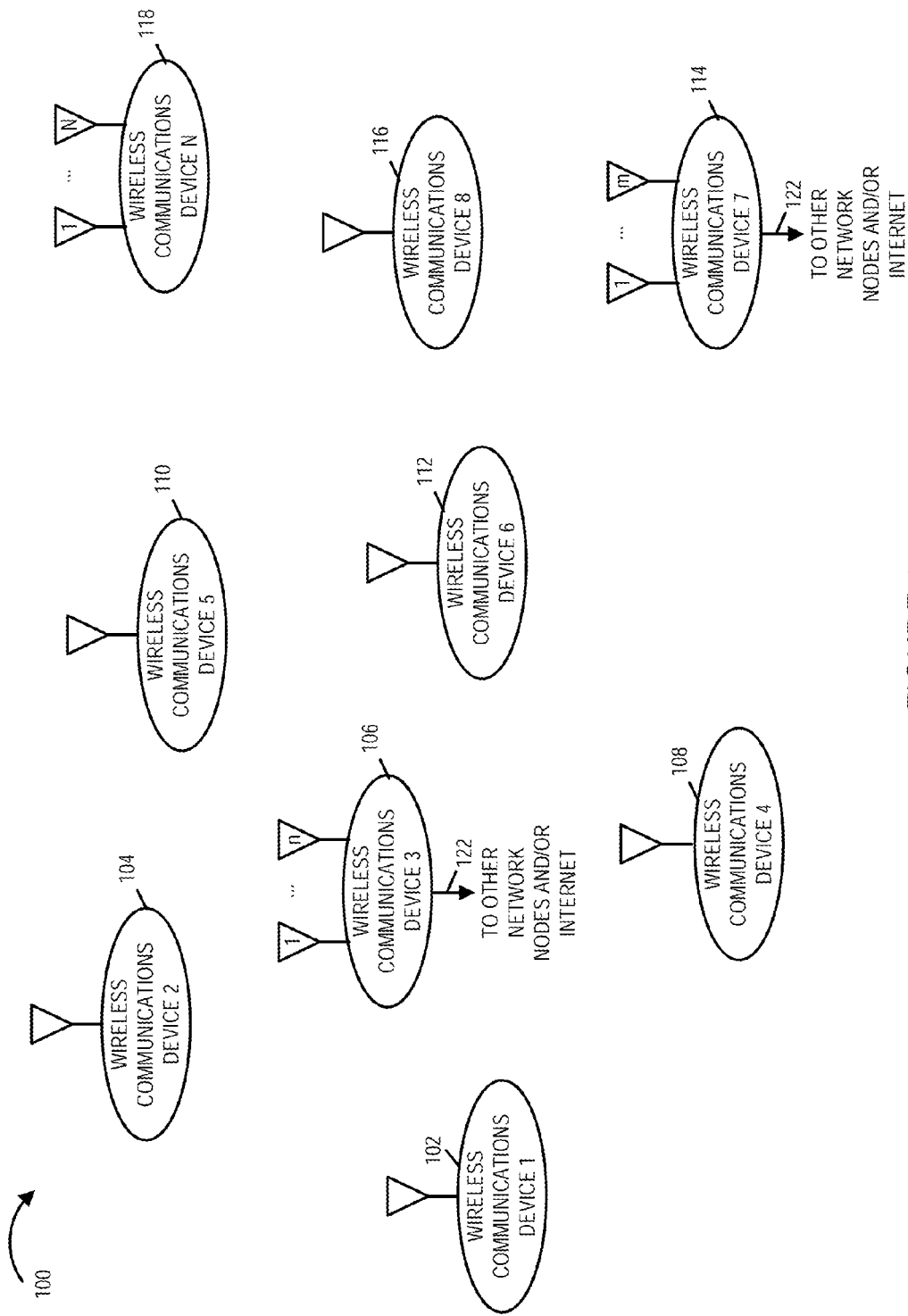
FIG. 1 is a drawing of an exemplary wireless communications system in accordance with an exemplary embodiment.

FIG. 1 is a drawing of an exemplary wireless communications system 100 in accordance with an exemplary embodiment. Exemplary wireless communications system 100 includes a plurality of wireless communications devices (wireless communications device 1 102, wireless communications device 2 104, wireless communications device 3 106, wireless communications device 4 108, wireless communications device 5 110, wireless communications device 6 112, wireless communications device 7 114, wireless communications device 8 116, . . . , wireless communications device N 118. Some of the wireless communications devices of system 100, e.g., device 3 106 and device 7 114, are coupled to other network nodes and/or the Internet via backhaul network 122.

Some of the wireless communications devices of system 100 are mobile devices, e.g., devices (102, 104, 108, 110, 112, 116, 118). Some of the wireless communications devices in the system 100 include multiple antennas, e.g., wireless communications 3 106 include n antenna, wireless communications device 7 114 includes m antennas and wireless communications device N 118 includes N antennas.

The wireless communications devices (102, 104, 106, 108, 110, 112, 114, 116, 118) support peer to peer communications and implement a peer to peer timing structure. Wireless communications device 3 106 and wireless communications device 7 114 are, e.g., access points supporting a peer to peer protocol, while wireless communications device N 118 is, e.g., a mobile node supporting the peer to peer protocol. At least some of the devices with multiple antennas can, and sometimes do, select different antennas to use for reception and transmission when communicating with the same device. In some embodiments, such a device generates receiver interference estimates upon which it bases its receive antenna selection and transmitter interference estimates upon which it bases its transmitter antenna selection. Thus, such a device may recognize asymmetric channel conditions with respect to another device and select different antennas for reception and transmission to best suit the interference environment.

Figures 2, 2A, 2B:
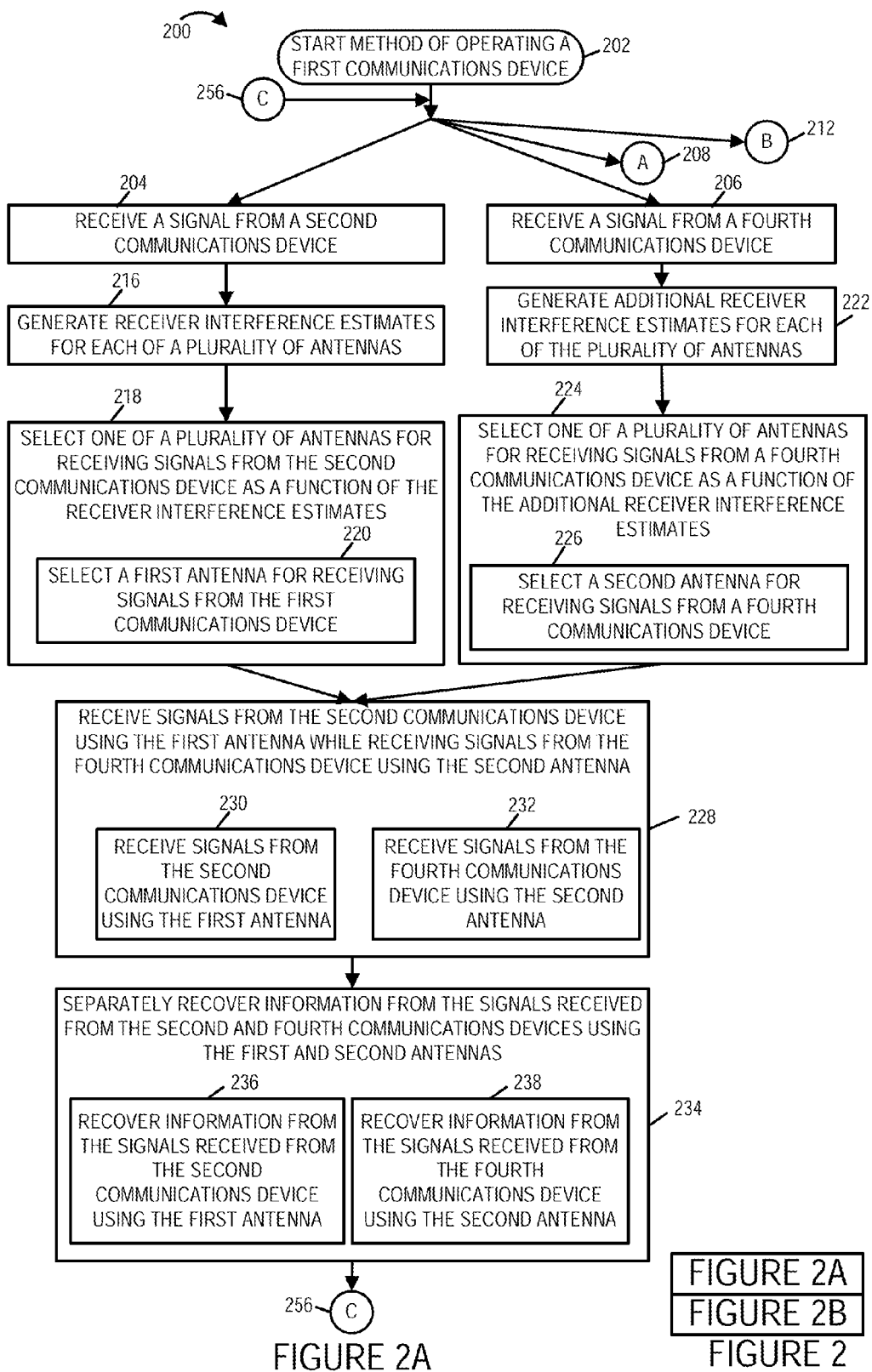
FIG. 2A is a first part of a flowchart of an exemplary method of operating a first communications device in accordance with an exemplary embodiment.
FIG. 2B is a second part of a flowchart of an exemplary method of operating a first communications device in accordance with an exemplary embodiment.
Figure 2B:
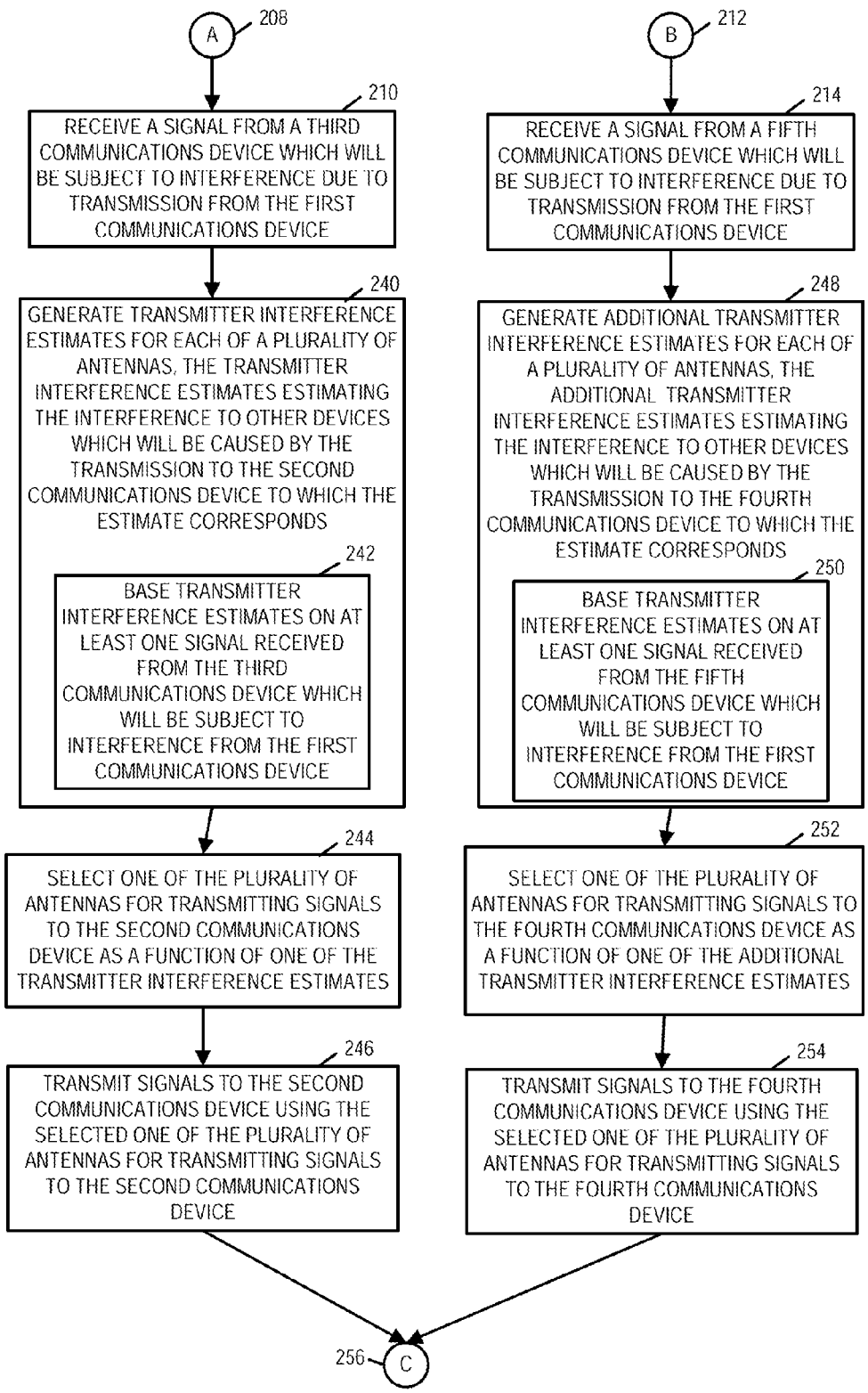

FIG. 2, comprising the combination of FIG. 2A and FIG. 2B is a flowchart 200 of an exemplary method of operating a first communications device, e.g., a wireless communications device supporting peer to peer communications, in accordance with an exemplary embodiment. The first communications device is, e.g., any of the exemplary communications devices of system 100 of FIG. 1 which include multiple antennas, e.g., wireless communications device 3 106, wireless communications device 7 114, wireless communications device N 118.

Operation starts in step 202, where the first communications device is powered on and initialized. Operation proceeds from step 202 to step 204 and step 206. Operation also proceeds from step 202 via connecting nodes (A 208, B 212) to steps (210, 214), respectively.

Returning to step 204, in step 204 the first communications device receives a signal from a second communications device. Operation proceeds from step 204 to step 216. In step 216 the first communications device generates receiver interference estimates for each of a plurality of antennas, e.g., based on the signal form the second communications device and signals received from other interfering devices. Then in step 218 the first communications device selects one of a plurality of antennas for receiving signals from the second communications device as a function of the receiver interference estimates from step 216. Step 218 includes sub-step 220 in which the first communications device selects a first antenna for receiving signals from the first communications device.

Returning to step 206, in step 206 the first communications device receives a signal from a fourth communications device. Operation proceeds from step 206 to step 222. In step 222 the first communications device generates additional receiver interference estimates for each of the plurality of antennas, e.g., based on the signal received from the fourth communications devices and signals received from other interfering devices. Then in step 224 the first communications device selects one of a plurality of antennas for receiving signals from the fourth communications device as a function of the additional receiver interference estimates from step 222. Step 224 includes sub-step 226 in which the first communications device selects a second antenna for receiving signals from the fourth communications device.

Operation proceeds from steps 218 and 224 to step 228, in which the first communications device receives signals from the second communications device using the first antenna while receiving signals from the fourth communications device using the second antenna. Step 228 includes sub-steps 230 and 232. In sub-step 230 the first communications device receives signals from the second communications device using the first antenna. In sub-step 232 the first communications device receives signals from the fourth communications device using the second antenna. In some embodiments, the signals which are received from the second and fourth communications devices using the first and second antennas, respectively, are signals which use the same communications resource, e.g., the same peer to peer transmission segment. Operation proceeds from step 228 to step 234.

In step 234 the first communications device separately recovers information from the signals received from the second and fourth communications devices using the first and second antennas. Step 234 includes sub-steps 236 and 238. In sub-step 236 the first communications device recovers information from signals received from the second communications device using the first antenna. In sub-step 238 the first communications device recovers information from the signals received from the fourth communications device using the second antenna. Operation proceeds from step 234 to connecting node C 256.

Returning to step 210, in step 210 the first communications device receives a signal from a third communications device, which will be subject to interference due to transmission from the first communications device. For example, the third communications may have an existing peer to peer connection with a sixth communications device, and the third communications device's reception of signals from the sixth communications device may be subject to interference from a transmission by the first communications device to the second communications device. Operation proceeds from step 210 to step 240. In step 240 the first communications device generates transmitter interference estimates for each of a plurality of antennas, the transmitter interference estimates estimating the interference to other devices which will be caused by the transmission to the second communications device to which the estimate corresponds. Step 240 includes sub-step 242, in which the first communications device bases transmitter interference estimates on at least one signal received from the third communications device, which will be subject to interference from the first communications device.

Operation proceeds from step 240 to step 244, in which the first communications device selects one of the plurality of antennas for transmitting signals to second communications device as a function of one of the transmitter interference estimates of step 240. Operation proceeds from step 244 to step 246. In step 246 the first communications device transmits signals to the second communications device using the selected one of the plurality of antennas for transmitting signals to the second communications device.

Returning to step 214, in step 214 the first communications device receives a signal from a fifth communications device, which will be subject to interference due to transmission from the first communications device. For example, the fifth communications device may have an existing connection with a seventh communications device, and the fifth communications device's reception of signals from the seventh communications device may be subject to interference from a transmission by the first communications device to the fourth communications device. Operation proceeds from step 214 to step 248. In step 248 the first communications device generates additional transmitter interference estimates for each of a plurality of antennas, the transmitter interference estimates estimating the interference to other devices which will be caused by the transmission to the fourth communications device to which the estimate corresponds. Step 248 includes sub-step 250, in which the first communications device bases transmitter interference estimates on at least one signal received from the fifth communications device, which will be subject to interference from the first communications device.

Operation proceeds from step 248 to step 252 in which the first communications device selects one of the plurality of antennas for transmitting signals to fourth communications device as a function of one of the additional transmitter interference estimates of step 248. Operation proceeds from step 252 to step 254. In step 254 the first communications device transmits signals to the fourth communications device using the selected one of the plurality of antennas for transmitting signals to the fourth communications device. In some embodiments, the signals which are transmitted from the first communications device to the second and fourth communications devices using different selected antennas, respectively, are signals which use the same communications resource, e.g., the same peer to peer transmission segment. Operation proceeds from step 246 and 254 to connecting node C 256. Operation proceeds from connecting node C 256 to steps 204, 206, 210 and 214.

In some embodiments, each of the plurality of antennas is located at a physical location which is separated from each of the other ones of the plurality of antennas. In various embodiments, each of the plurality of antennas is pointed in a different direction from each of the other one of said plurality of antennas.

A different antenna may be, and sometimes is, selected for receiving signals from the second communications device than is selected for transmitting signals to the second communications device. A different antenna may be, and sometimes is, selected for receiving signals from the fourth communications device than is selected for transmitting signals to the fourth communications device.

Figure 3:
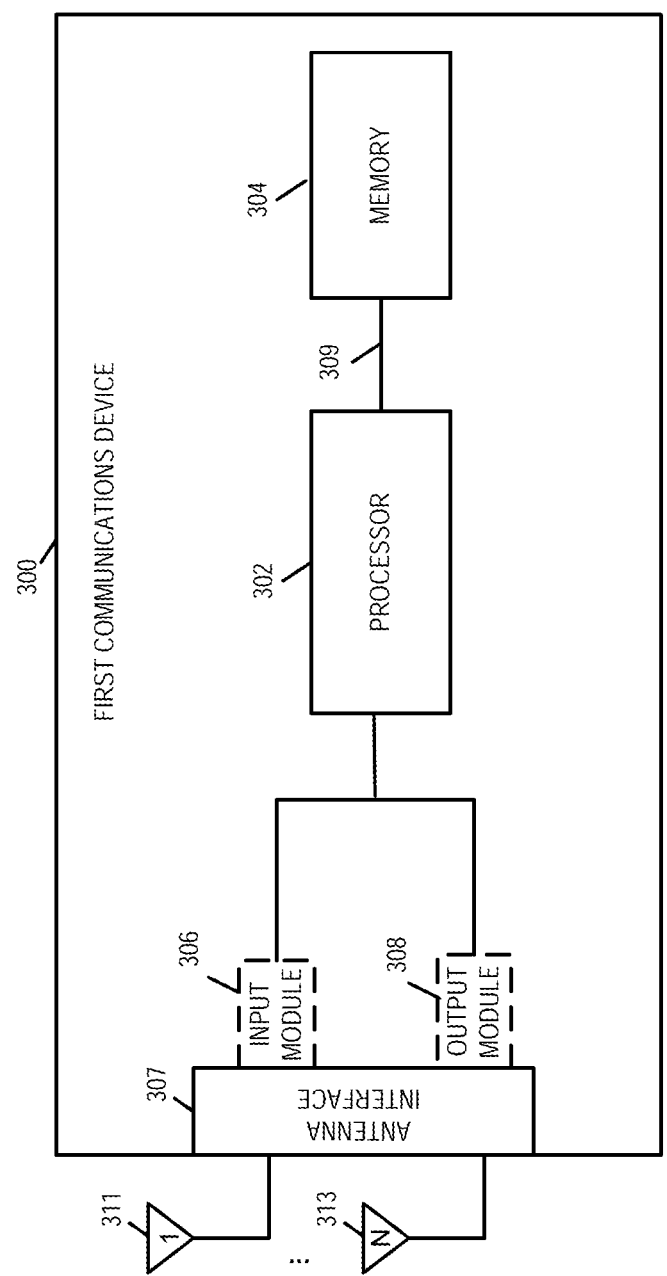
FIG. 3 is a drawing of an exemplary first communications device, in accordance with an exemplary embodiment.

FIG. 3 is a drawing of an exemplary first communications device 300, in accordance with an exemplary embodiment. Exemplary communications device 300 is, e.g., one of the wireless communications devices of FIG. 1. Exemplary communications device 300 may, and sometimes does, implement a method in accordance with flowchart 200 of FIG. 2.

Communications device 300 includes a processor 302 and memory 304 coupled together via a bus 309 over which the various elements (302, 304) may interchange data and information. Communications device 300 further includes an input module 306 and an output module 308 which may be coupled to processor 302 as shown. However, in some embodiments, the input module 306 and output module 308 are located internal to the processor 302. Input module 306 can receive input signals. Input module 306 can, and in some embodiments does, include a wireless receiver and/or a wired or optical input interface for receiving input. Output module 308 may include, and in some embodiments does include, a wireless transmitter and/or a wired or optical output interface for transmitting output. Input module 306 and output module 308 are coupled to antenna interface 307. A plurality of antennas (antenna 1 311, . . . , antenna N 313) are coupled to antenna interface 307.

Processor 302 is configured to generate receiver interference estimates for each of a plurality of antennas; select one of the plurality of antennas for receiving signals from a second communications device as a function of the receiver interference estimates; generate transmitter interference estimates for each of the plurality of antennas, the transmitter interference estimates estimating the interference to other devices which will be caused by transmission to the second communications device from the antenna to which the estimate corresponds; and select one of the plurality of antennas for transmitting signals to the second communications device as a function of one of the transmitter interference estimates. In some embodiments, processor 302 is further configured to: receive a signal from a second communications device; and generate at least one of the receiver interference estimates based on the signal received from the second communications device.

In various embodiments, each of the plurality of antennas is located at a physical location which is separated from the other ones of said plurality of antennas. In some embodiments, each of the plurality of antennas is pointed in a different direction from each of the other ones of said plurality of antennas.

Processor 302, in some embodiments, is configured to base the transmitter interference estimates on at least one signal received from a third device, which will be subject to interference due to transmission from the first communications device.

Processor 302, in some embodiments, is further configured to select a different antenna for receiving signals from the second device than for transmitting signals to the second device. Processor 302, in some embodiments, is further configured to select a first antenna for receiving signals from the second communications device as part of being configured to select one of the plurality of antennas for receiving signals.

In some embodiments, the first communications device can communicate concurrently with a plurality of devices. In one such embodiment processor 302 is further configured to: select a second antenna for receiving signals from a fourth communications device; and receive signals from the second communications device using said first antenna while receiving signals from the fourth communications device using the second antenna; and separately recover information from the signals received from the second and fourth communications devices using the first and second antennas. In some such embodiments, said signals which are received from the second and fourth communications devices using the first and second antennas, respectively, may be, and sometimes are, signals which use the same communications resource.

Figures 4, 4A:
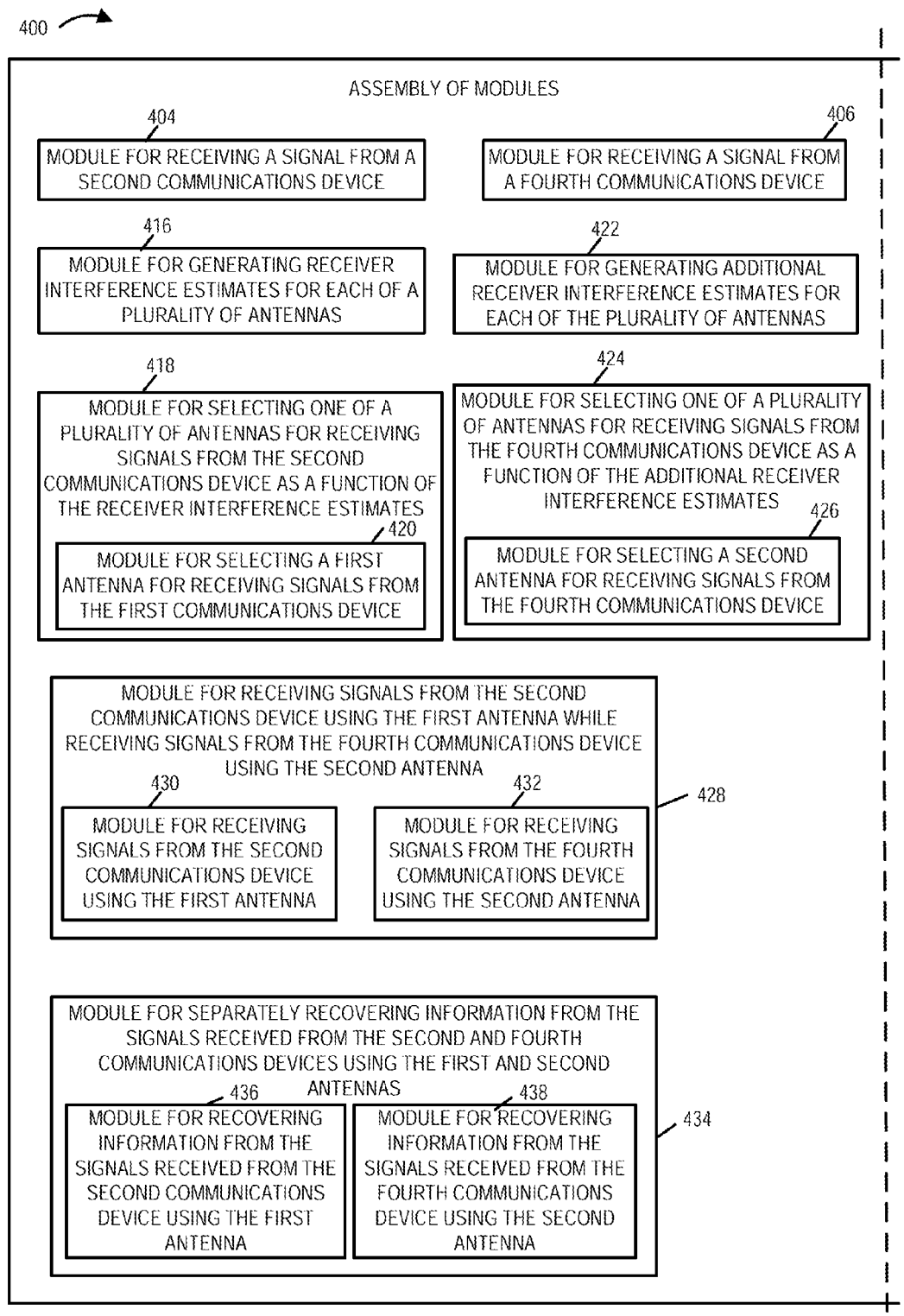
FIG. 4A is a first part of an assembly of modules which can, and in some embodiments is, used in the first communications device illustrated in FIG. 3.
Figure 4B:
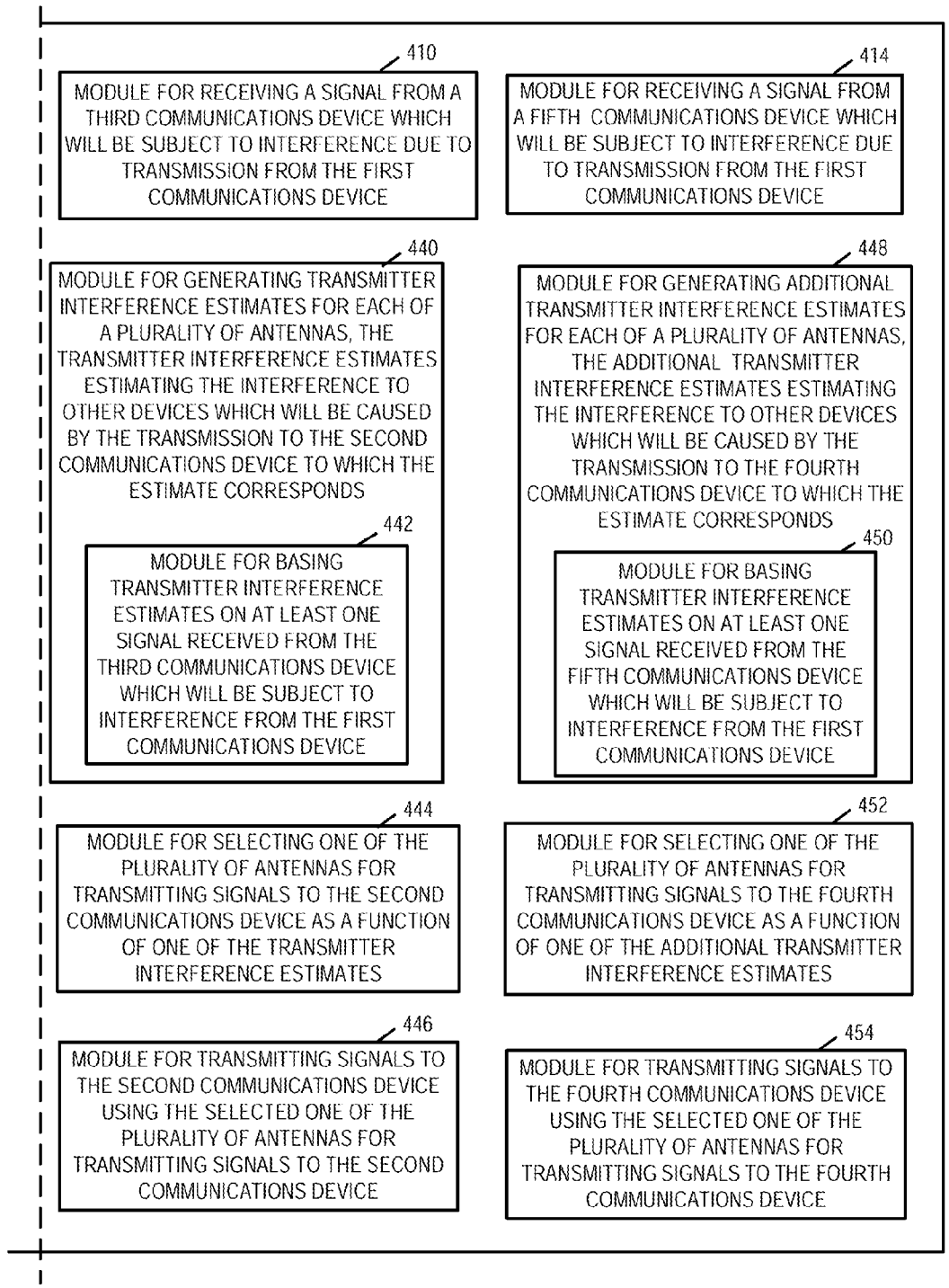
FIG. 4B is a second part of an assembly of modules which can, and in some embodiments is, used in the first communications device illustrated in FIG. 3.

FIG. 4, comprising the combination of FIG. 4A and FIG. 4B, is an assembly of modules 400 which can, and in some embodiments is, used in the first communications device 300 illustrated in FIG. 3. The modules in the assembly 400 can be implemented in hardware within the processor 302 of FIG. 3, e.g., as individual circuits. Alternatively, the modules may be implemented in software and stored in the memory 304 of the first communications device 300 shown in FIG. 3. While shown in the FIG. 3 embodiment as a single processor, e.g., computer, it should be appreciated that the processor 302 may be implemented as one or more processors, e.g., computers. When implemented in software the modules include code, which when executed by the processor, configure the processor, e.g., computer, 302 to implement the function corresponding to the module. In some embodiments, processor 302 is configured to implement each of the modules of the assembly of modules 400. In embodiments where the assembly of modules 400 is stored in the memory 304, the memory 304 is a computer program product comprising a computer readable medium comprising code, e.g., individual code for each module, for causing at least one computer, e.g., processor 302, to implement the functions to which the modules correspond.

Completely hardware based or completely software based modules may be used. However, it should be appreciated that any combination of software and hardware (e.g., circuit implemented) modules may be used to implement the functions. As should be appreciated, the modules illustrated in FIG. 4 control and/or configure the first communications device 300 or elements therein such as the processor 302, to perform the functions of the corresponding steps illustrated in the method flowchart 200 of FIG. 2.

Assembly of modules 400 includes a module 404 for receiving a signal from a second communications device, a module 406 for receiving a signal from a fourth communications device, a module 410 for receiving a signal from a third communications device, which will be subject to interference due to transmission from the first communications device, and a module 414 for receiving a signal from a fifth communications device, which will be subject to interference from the first communications device. Assembly of modules 400 further includes a module 416 for generating receiver interference estimates for each of a plurality of antennas, e.g., based on information including a signal or signals received by module 404, a module 418 for selecting one of a plurality of antennas for receiving signals from the second communications device as a function of the receiver interference estimates generated by module 416, a module 422 for generating additional receiver interference estimates for each of the plurality of antennas, e.g., based on information including a signal or signals received by module 406, and a module 424 for selecting one of a plurality of antennas for receiving signals from the fourth communications device as a function of the additional receiver interference estimates generated by module 422. Module 418 includes module 420 for selecting a first antenna for receiving signals for the first communications device. Module 424 includes a module 426 for selecting a second antenna for receiving signals from the fourth communications device. The first and second antennas may be, and sometimes are, different.

Assembly of modules 400 further includes a module 428 for receiving signals from the second communications device using the first antenna while receiving signal from the fourth communications device using the second antenna and a module 434 for separately recovering information from the signals received from the second and fourth communications devices using the first and second antennas, respectively. Assembly of modules 428 further includes a module 430 for receiving signals from the second communications device using the first antenna and a module 432 for receiving signal from the fourth communications device using the second antenna. Module 434 includes a module 436 for recovering information from the signals received from the second communications device using the first antenna and a module 438 for recovering information from the signals received from the fourth communications device using the second antenna.

Assembly of modules 400 further includes a module 440 for generating transmitter interference estimates for each of a plurality of antennas, the transmitter interference estimates estimating the interference to other devices which will be caused by the transmission to the second device to which the estimate corresponds, a module 444 for selecting one of the plurality of antennas for transmitting signals to the second communications device as a function of one of the transmitter interference estimates generated by module 440 and a module 446 for transmitting signals to the second communications device using the selected one of the plurality of antennas for transmitting signals to the second communications device. Module 440 includes module 442 for basing transmitter interference estimates on at least one signal received from the third communications device which will be subject to interference from the first communications device.

Assembly of modules 400 further includes a module 448 for generating additional transmitter interference estimates for each of a plurality of antennas, the additional transmitter interference estimates estimating the interference to other devices which will be caused by the transmission to the fourth communications device to which the estimate corresponds, a module 452 for selecting one of a plurality of antennas for transmitting signals to the fourth communications device as a function of one of the additional transmitter interference estimates generated by module 448 and a module 454 for transmitting signals to the fourth communications device using the selected one of the plurality of antennas for transmitting signal to the fourth communications device. Module 448 includes a module 450 for basing the transmitter interference estimates on at least one signal received from the fifth communications device which will be subject to interference from the first communications device.

In some embodiments, at least one of the generated receiver interference estimates is generated by said module for generating receiver interference estimates 416 based on the signal received from the second communications device by module 404. In some embodiments, at least one of the generated additional receiver interference estimates is generated by said module for generating additional receiver interference estimates 422 based on the signal received from the fourth communications device by module 406. In some embodiments, each of the plurality of antennas is located at a physical location which is separated from the other ones of said plurality of antennas. In some embodiments, each of the plurality of antennas is pointed in a different direction from each of the other ones of said plurality of antennas.

In some embodiments, module 418 may, and sometimes does, select a different antenna for receiving signals from the second device than the antenna that module 444 selects for transmitting signals to the second communications device.

In some embodiments, said signals which are received from the second and fourth communications devices using the first and second antennas, respectively, may be, and sometimes are, signals which use the same communications resource, e.g., same air link transmission segment in a peer to peer timing/frequency structure. In some embodiments, said signals which are transmitted to the second and fourth communications devices using different antennas, may be, and sometimes are, signals which use the same communications resource, e.g., same air link transmission segment in a peer to peer timing/frequency structure.

Various features and aspects related to an exemplary peer to peer communications device equipped with multiple antennas and methods of operating a peer to peer communications device equipped with multiple antennas will be described. Aspects of device architecture and methods of a peer to peer wireless communications device equipped with multiple antennas, e.g., an access point with peer to peer capability which includes multiple antennas, are described. The exemplary peer to peer wireless communications device is, e.g., part of a peer to peer wireless communications system implementing a peer to peer protocol. The same or similar architecture and methods are applicable to other wireless communications device, e.g., a wireless mobile node device such as an active RF ID device that is implemented with multiple antennas.

Figure 5:
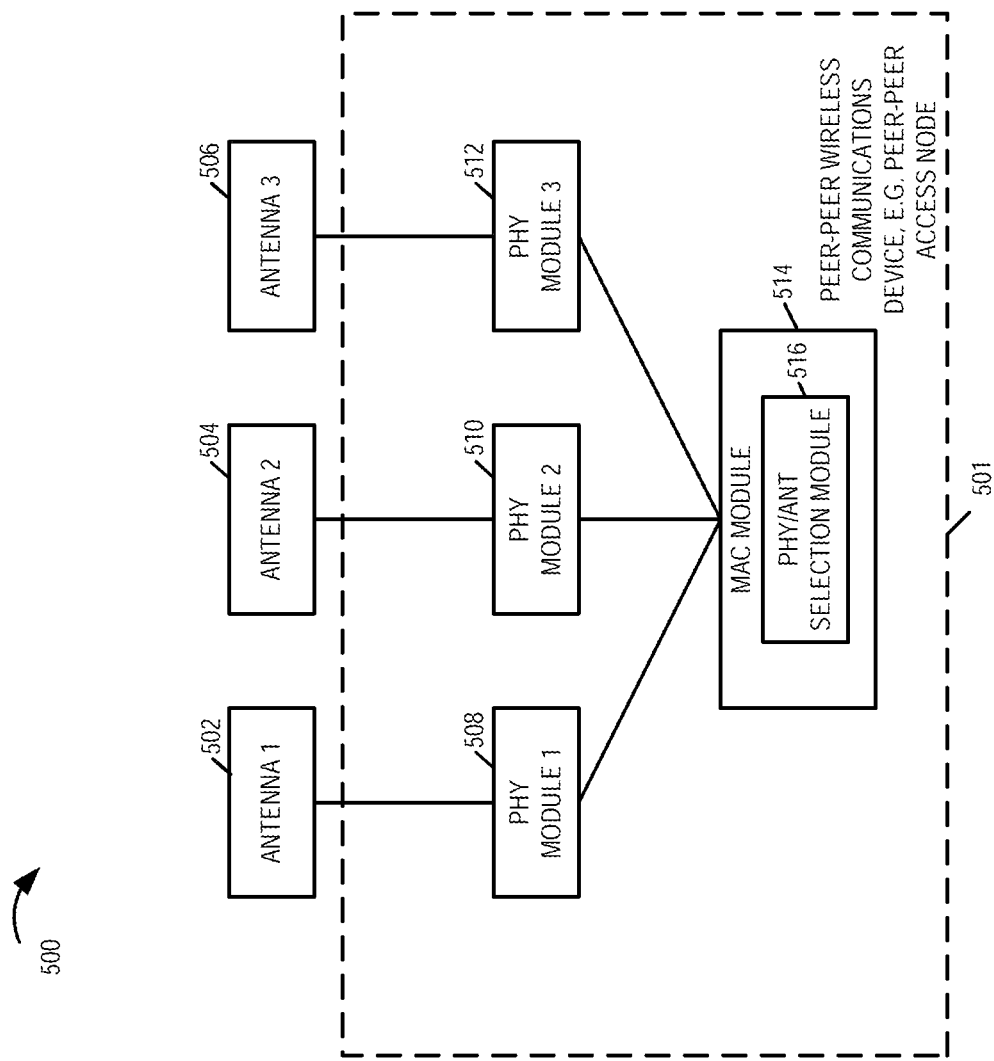
FIG. 5 is a drawing 500 illustrating an exemplary high level diagram of an device architecture.

FIG. 5 is a drawing 500 illustrating an exemplary high level diagram of an exemplary device architecture. Drawing 500 includes an exemplary peer to peer wireless communications device 501, e.g., a peer to peer access node, coupled to a plurality of antennas (antenna 1 502, antenna 2 504, antenna 3 506). In some embodiments, the antennas are included as part of the peer to peer wireless communications device 501. For each antenna (antenna 1 502, antenna 2 504, antenna 3 506), there is a corresponding PHY module (PHY module 1 508, PHY module 2 510, PHY module 3 512), respectively, that carries out the physical layer functions, such as, e.g., synchronization, channel estimation, signal detection, encoding/decoding, etc. Those PHY modules (508, 510, 512) are coupled to a MAC module 514 that carries out the MAC functions, such as, e.g., scheduling. The MAC module 514 may, and in some embodiments does, also implement certain upper layer functions and/or is coupled with other modules that implement upper layer functions. The MAC module 514 includes a PHY/antenna selection unit 516 that selects one of the plurality of the PHY modules and the corresponding antennas ((508, 502), (510, 504), (512, 506) for transmission to and/or reception from another peer to peer device in accordance with certain interference management and scheduling methods. The antennas (502, 504, 506) may be included as part of the communications device or may be coupled to the communications device.

The peer to peer communications device 501, e.g., access point with peer to peer capability, is equipped with or coupled to a plurality of antennas (502, 504, 506). The antennas (502, 504, 506), in some embodiments, are placed relatively far apart but are coupled via PHY modules (508, 510, 512) and cable to the centralized MAC module 514, which controls the use of those antennas (502, 504, 506) to serve other peer to peer communications devices in the area. Various aspects relate to an antenna selection scheme to utilize multiple antennas, e.g., to improve diversity, although the device architecture also allows other multiple antenna schemes such as beamforming.

An exemplary method of operating the exemplary peer to peer communications device in one exemplary peer-to-peer communication system is explained in the following. First, each of peer to peer wireless communications, devices X and device Y broadcasts a peer discovery signal, which indicates the presence of the device. Thus, after receiving the peer discovery signal from device Y, device X is now aware of the presence of device Y. Suppose that device X intends to communicate with device Y. Then device X pages device Y to establish a connection, and the traffic between device X and device Y can be transported in the connection.

To broadcast its peer discovery signal, device X acquires a PDRID (peer discovery resource ID). A PDRID corresponds to a particular subset of channel resource in the peer discovery channel. Similarly, a connection is associated with a CID (connection ID). A CID corresponds to a particular subset of channel resource in the traffic control channel, which is used for scheduling traffic and managing interference among different peer-to-peer communication connections.

In accordance with various aspects, there are a few possible use scenarios of the multiple antennas in such a peer to peer communications system implementing a peer to peer protocol or protocols.

For the peer discovery protocol, in one embodiment, a peer to peer access point acquires a single PDRID. Each of the multiple antennas transmits the (same) peer discovery signal using the channel resource corresponding to that PDRID. From a nearby peer to peer communications device, e.g., mobile node, perspective, it is completely transparent whether the peer to peer access point is using multiple antennas to send the peer discovery signal or not. Thus, if the receiving peer to peer device, e.g., mobile node, is close to one of the access point transmitting antennas, the signal from the closest antenna dominates. However, if the receiving peer to peer device, e.g., mobile node, is in the middle of two antennas, then the signals from those two antennas mix in the air and may add constructively or destructively at the device receiver.

In another embodiment, the peer to peer access point acquires multiple PDRIDs, each for one of the multiple antennas. Each of the multiple antennas transmits the peer discovery signal using the channel resource corresponding to its own PDRID. The peer discovery signal from individual antennas may be the same or different.

Figure 6:
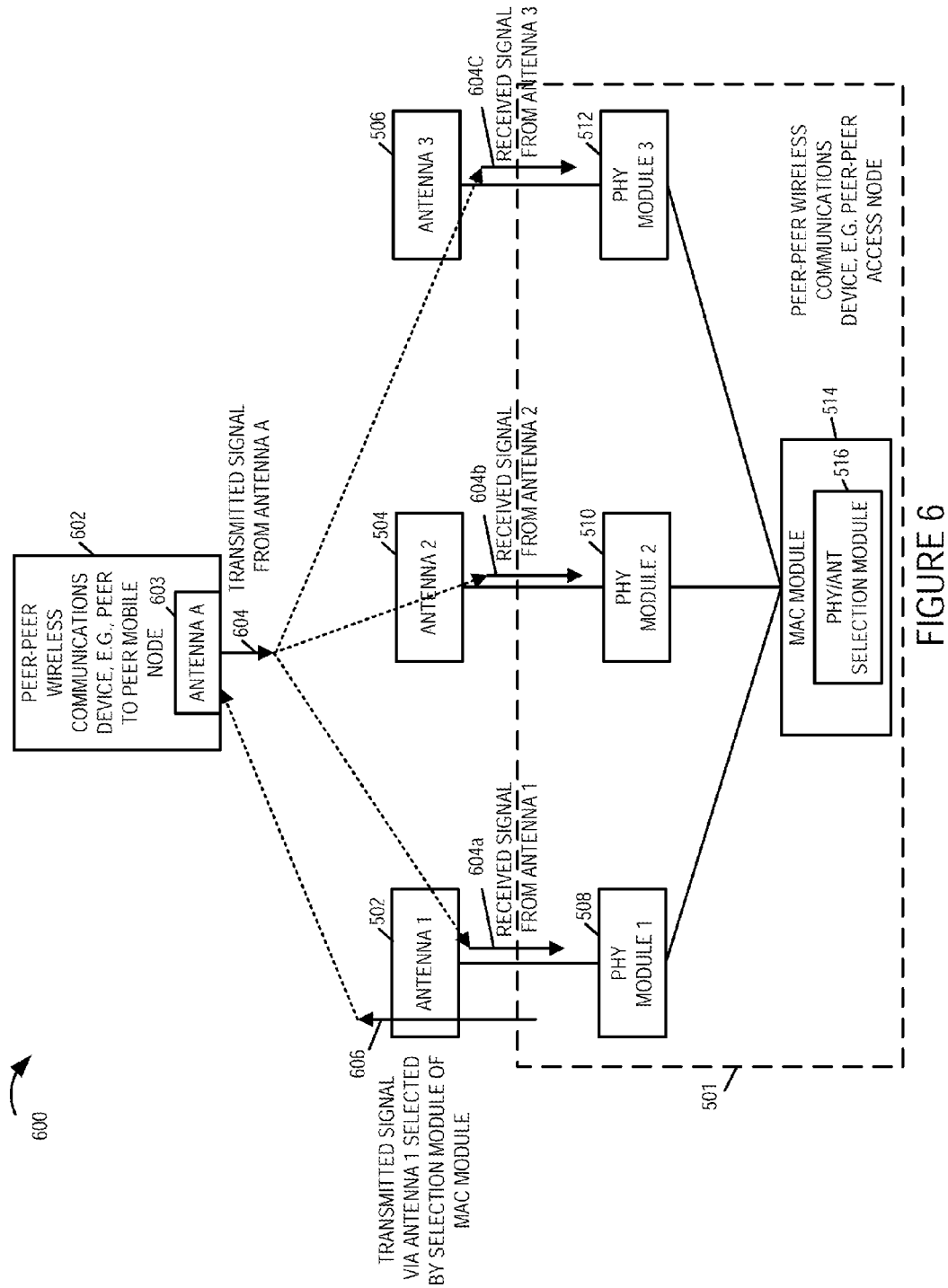

For the connection protocol, in one embodiment, the peer to peer access point acquires one CID to serve a peer to peer device, e.g., to serve a peer to peer mobile node. The CID is used in each of the multiple antennas in the sense that each of the multiple antennas and the associated PHY modules receive the signal in the channel resource corresponding to that CID from the device. Then the MAC module selects the appropriate PHY module and the associated antenna to send the signal to the device. For example, suppose that in a traffic frame, a peer to peer communications device, e.g., a mobile node, sends an uplink signal, e.g., a request signal, and the peer to peer access point receives the request signal in each of the antennas, and the received powers are P1, P2, P3, . . . , respectively. Based on received signal power level as well as interference detection considerations, the MAC module of the peer to peer access point may select one of the antennas to send a downlink signal, e.g., a response signal, to the mobile node device. In particular, because of interference management, the MAC module may not necessarily select the antenna that has the highest received signal power. Note that the antenna selection can vary from one traffic frame to another, thereby providing fast switching of the PHY attachment point depending on the channel and interference variation. This approach is illustrated in drawing 600 FIG. 6.

Drawing 600 illustrates exemplary peer to peer wireless communications device 501 of FIG. 5, e.g., a peer to peer access point, and exemplary peer to peer wireless communications device 602, e.g., a peer to peer mobile node. Peer to peer wireless communications device 602 includes antenna A 603. Transmitted signal 604 from peer to peer mobile node 602 is received by the three antennas (502, 504, 506) as (received signal from antenna 1 604a, received signal from antenna 2 604b, received signal from antenna 3 604c), respectively. Based on received power level and interference detection considerations, selection module 516 of MAC module 514 selects one of the antennas (502, 504, 506) to send a downlink signal to mobile peer to peer device 602. In this example, selection module 516 selects to use antenna 1 502 to send exemplary downlink signals 606 to wireless mobile peer to peer device 602.

Alternatively, the selection module 516 of the MAC module 514 may decide to use a first one of the multiple antennas to receive the request signal for the CID and then decide to use a second one of the multiple antennas to transmit the response signal. The first and the second ones may be the same or different depending on the selection method. While the peer to peer access point 501 is switching the PHY attachment point, the device 501 is transparent from the perspective of the peer to peer mobile node 602.

Figure 7:
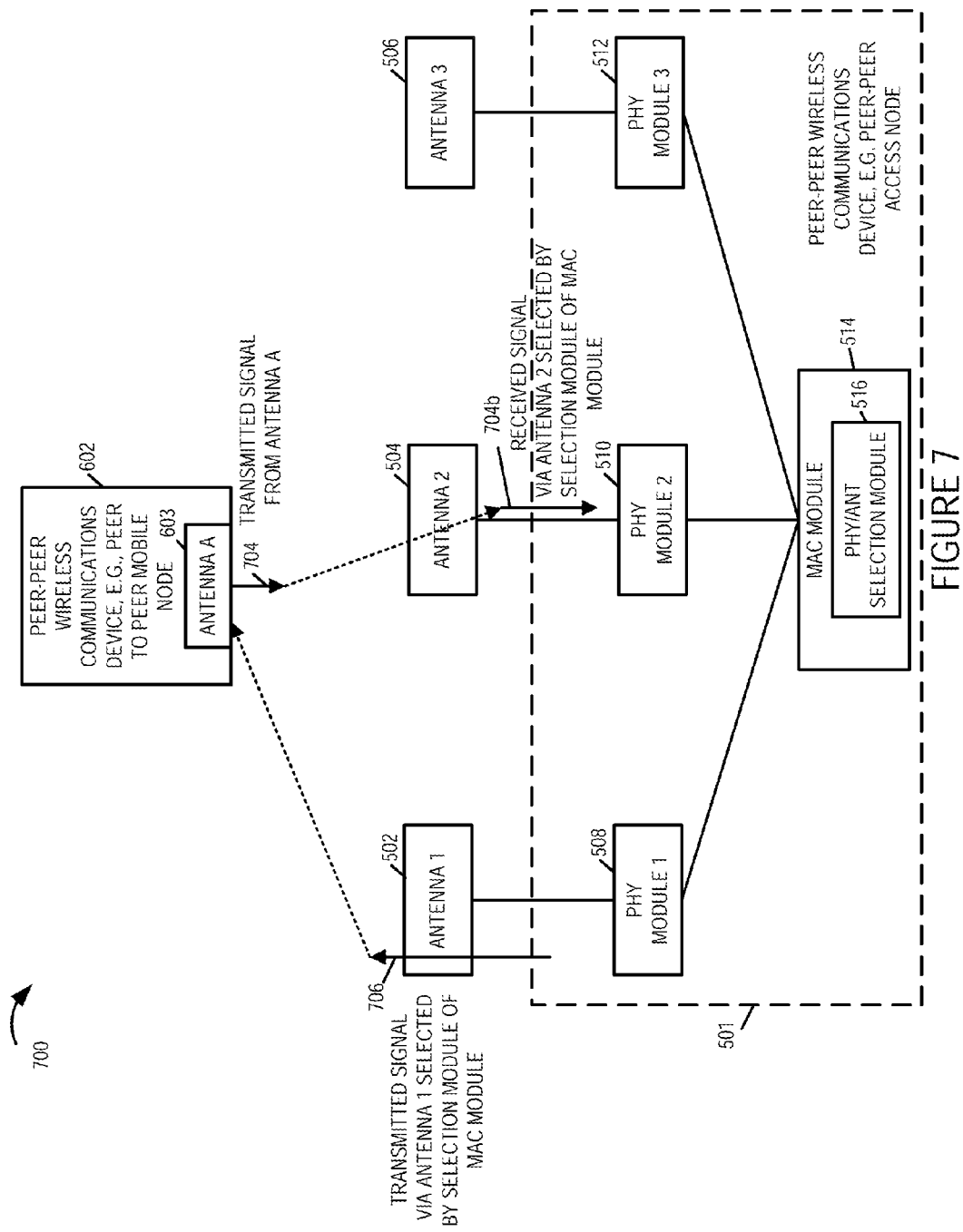

FIG. 7 includes a drawing 700 illustrating an example, where the selection module 516 of MAC module 514 of peer to peer access point 501 has decided to use different antennas for receiving signals from and transmitting signals to peer to peer mobile node 602. In this example, selection module 516 selects to use antenna 2 504 to receive signals from peer to peer mobile node 602 and to use antenna 1 502 to transmit signals to peer to peer wireless mobile node 602. Exemplary transmitted signal 704 is received by antenna 2 504 as received signal 704b, processed by PHY module 2 510 and then processed by MAC module 514. MAC module 514 generates a downlink signal which is fed to PHY module 1 508 and transmitted via antenna 1 502 as transmitted signal 706.

In some embodiments, MAC module 514 generates one or more receiver interference estimates. In some such embodiments, selection module 516 makes a receive antenna selection based on one or more receiver interference estimates. In some embodiments, MAC module 514 generates one or more transmitter interference estimates. In some such embodiments, selection module 516 makes a transmit antenna selection based on one or more transmitter interference estimates.

In another embodiment, the peer to peer access point acquires one CID to serve two distinct peer to peer communications devices, e.g. two distinct peer to peer mobile nodes. Presumably one device is close to a first antenna and the other device is close to a second antenna. Because the antennas are placed relatively far apart, the interference situation is such that the peer to peer access point can reuse the same CID to maintain two separate connections with those two devices simultaneously. In this case, the same CID is used in the two antennas but each antenna is the PHY attachment point of the corresponding device. In such an embodiment, the peer to peer access point cannot arbitrarily switch antennas as in the previous embodiment.

When the multiple antennas are connected via cable to the common MAC module, it may be desirable that the cable propagation delay be calibrated and compensated such that the physical layer symbol timing is essentially the same across the antennas. Thus, in some embodiments, a wireless communications device with multiple antennas, e.g., a peer to peer access point with multiple antennas, calibrates for and/or compensates for cable propagation delays such that physical layer symbol timing is substantially the same across the antennas.

In some embodiments, the peer to peer access point can, and sometimes does, use multiple antennas to implement sectorization of a given serving area. In particular, a peer to peer device, e.g., a peer to peer mobile node, close to one of the antennas will be served by that antenna. A peer to peer device, e.g., a peer to peer mobile node, in the middle of two antennas is similar to a cellular wireless WAN user in a sector boundary. In accordance with some embodiments, the peer to peer access point uses fast antenna switching schemes to provide macro-diversity to the sector boundary peer to peer device, e.g., the sector boundary mobile node. In one example, the peer to peer access point may, and sometimes does, receive signal from the sector boundary device at each of a plurality of antennas and may, and sometimes does, send signal to the device using different antennas in successive traffic frames. In still another example, the peer to peer access point may receive signal from the sector boundary device from one of the antennas and may send signal to the device via the same or a different antenna.

FIG. 8 is a drawing 800 illustrating an exemplary peer to peer wireless communications system including a plurality of wireless communications devices (wireless communications device A 802, wireless communications device B 804, wireless communications device C 806, wireless communications device D 808, wireless communications device E 810, wireless communications device F 812). Wireless communications device A 802 includes multiple antennas including antenna 1 814 and antenna 2 816. Wireless communications device A 802 is, e.g., a device implementing a method of flowchart 200 of FIG. 2 and/or a device implemented in accordance with FIG. 3 and/or FIG. 4. In some embodiments, antenna 1 814 is located at physical location which is separated from antenna 2 814. In some embodiments, antenna 1 814 is pointed in a different direction from antenna 2 816. For example, in one embodiment, antenna 1 may be located on one floor or level of a building or structure and antenna 2 may be located on a different floor or level of the same building or structure. As another example, antenna 1 may be located on a first side of a building or structure and antenna 2 may be located on a different side of the same building or structure.

Consider that device A 802 and device B 804 have an established peer to peer connection indicated by bi-directional dashed line arrow 818 and labeled as peer to peer connection 1. Further consider that device C 806 and device D 808 have an established peer to peer connection indicated by bi-directional dashed line arrow 820 and labeled as peer to peer connection 2. Further consider that device E 810 and device F 812 have an established peer to peer connection indicated by bi-directional dashed line arrow 822 and labeled as peer to peer connection 3.

FIG. 9 is a drawing 900 illustrating the system of FIG. 8 including exemplary intended traffic signaling directions and some exemplary control signaling used by device A 802 in generating receiver interference estimates. In FIG. 9 with regard to connection 1, device B 804 desires to transmit traffic signals to device A 802, as indicated by dashed line arrow 902. As part of the control signaling protocol, device B 804 transmits device B traffic transmission request signal 908 directed to device A 802. In FIG. 9 with regard to connection 2, device C 806 desires to transmit traffic signals to device D 808, as indicated by dashed line arrow 904. As part of the control signaling protocol, device C 806 transmits device C traffic transmission request signal 910 directed to device D 808. In FIG. 9 with regard to connection 3, device E 810 desires to transmit traffic signals to device F 812, as indicated by dashed line arrow 906. As part of the control signaling protocol, device E 810 transmits device E traffic transmission request signal 912 directed to device F 812. Device A 802 receives the transmitted traffic transmission request signals (908, 910, 912) on each of its antennas (antenna 1 814, antenna 2 816) and measures the received signals.

FIG. 10 is a drawing 1000 illustrating exemplary receiver interference estimates based on received signals described in FIG. 9. Device A 802 generates an antenna 1 receiver interference estimate, as indicated by box 1002, based on received signals corresponding to transmitted traffic transmission request signals (908, 910, 912) which have been received via antenna 1 814. Device A 802 generates an antenna 2 receiver interference estimate, as indicated by box 1004, based on received signals corresponding to transmitted traffic transmission request signals (908, 910, 912) which have been received via antenna 2 816.

FIG. 11 is a drawing 1100 illustrating exemplary device A receive antenna selection based on the generated antenna receiver interference estimates (1002, 1004) of FIG. 10. In this example, device A 1102 has selected, based on the interference estimates (1002, 1004) to receive peer to peer traffic signals using receive antenna 1 as indicated by box 1102. Device B 804 transmits peer to peer traffic signal 1104 to device A 802. Device A 802 receives peer to peer traffic signal 1104 via its selected antenna which is antenna 1 814. Device C 806 transmits peer to peer traffic signal 1106 to device D 808. Device E 810 transmits peer to peer traffic signal 1108 to device F 812. In some embodiments, the peer to peer traffic signals (1104, 1106, 1108) are transmitted concurrently on the same air link resources, e.g., the same set of time-frequency transmission units. Device A 802 has advantageously selected antenna 1 814 as its receive antenna to provide better reception of traffic signals 1104 in view of expected interference from traffic signals 1106 and 1108.

FIG. 12 is a drawing 1200 illustrating the system of FIG. 8 including exemplary intended traffic signaling directions and some exemplary control signaling used by device A 802 in generating transmitter interference estimates. In FIG. 12 with regard to connection 1, device A 802 desires to transmit traffic signals to device B 804, as indicated by dashed line arrow 1202. As part of the control signaling protocol, device B 804 transmits device B traffic transmission request response signal 1208 directed to device A 802. In FIG. 12 with regard to connection 2, device C 806 desires to transmit traffic signals to device D 808, as indicated by dashed line arrow 1204. As part of the control signaling protocol, device D 808 transmits device D traffic transmission request response signal 1210 directed to device C 806. In FIG. 12 with regard to connection 3, device E 810 desires to transmit traffic signals to device F 812, as indicated by dashed line arrow 1206. As part of the control signaling protocol, device F 812 transmits device F traffic transmission request response signal 1212 directed to device E 810. Device A 802 receives the transmitted traffic transmission request response signals (1208, 1210, 1212) on each of its antennas (antenna 1 814, antenna 2 816) and measures the received signals.

FIG. 13 is a drawing 1300 illustrating exemplary transmitter interference estimates based on received signals described in FIG. 12. Device A 802 generates an antenna 1 transmitter interference estimate estimating the interference that will be caused to device D 808 by a device A 802 transmission to device B 804 if antenna 1 814 is used, as indicated by box 1302, the estimate being based on received signals corresponding to transmitted traffic transmission request response signals (1208, 1210) which have been received via antenna 1 814. Device A 802 generates an antenna 1 transmitter interference estimate estimating the interference that will be caused to device F 812 by a device A 802 transmission to device B 804 if antenna 1 814 is used, as indicated by box 1304, the estimate being based on received signals corresponding to transmitted traffic transmission request response signals (1208, 1212) which have been received via antenna 1 814.

Device A 802 generates an antenna 2 transmitter interference estimate estimating the interference that will be caused to device D 808 by a device A 802 transmission to device B 804 if antenna 2 816 is used, as indicated by box 1306, the estimate being based on received signals corresponding to transmitted traffic transmission request response signals (1208, 1210) which have been received via antenna 2 816. Device A 802 generates an antenna 2 transmitter interference estimate estimating the interference that will be caused to device F 812 by a device A 802 transmission to device B 804 if antenna 2 816 is used, as indicated by box 1308, the estimate being based on received signals corresponding to transmitted traffic transmission request response signals (1208, 1212) which have been received via antenna 2 816.

FIG. 14 is a drawing 1400 illustrating exemplary device A transmit antenna selection based on the generated antenna transmitter interference estimates (1302, 1304, 1306, 1308) of FIG. 13. In this example, device A 802 has selected, based on the interference estimates (1302, 1304, 1306, 1308) to transmit peer to peer traffic signals using receive antenna 2 as indicated by box 1402. Device A 802 transmits peer to peer traffic signal 1404 to device B 804, via its selected antenna which is antenna 2 816. Device C 806 transmits peer to peer traffic signal 1406 to device D 808. Device E 810 transmits peer to peer traffic signal 1408 to device F 812. In some embodiments, the peer to peer traffic signals (1404, 1406, 1408) are transmitted concurrently on the same air link resources, e.g., the same set of time-frequency transmission units. Device A 802 has selected antenna 2 816 to as its transmit antenna in view of interference estimation information, e.g., to provide better reception, e.g., a lower level of interference, at one or more receiver devices (808, 812), than would be expected if the alternative antenna, antenna 1 814, had been selected for transmission of traffic signal 1404.

Note that in the example presented in FIGS. 8-14, wireless communications device A 814 selects to use antenna 1 814 when receiving peer to peer traffic signals from device B 804; however, device A 802 selects to use antenna 2 816 when receiving peer to peer traffic signals from device B 804. Note also that the receive antenna selection is based on receiver interference estimates while the transmitter antenna selection is based on transmitter interference estimates.

FIG. 15 illustrates an example in which wireless communications device A 802 selects different antennas for receiving signals from two different wireless communications devices. FIG. 15 illustrates the exemplary communications devices of FIG. 8 (802, 804, 806, 808, 810, 812) plus and additional communications device, wireless communications device G 1502.

Consider that: device A 802 and device B 804 have an established peer to peer connection, device C 806 and device D 808 have an established peer to peer connection, device E 810 and device F 812, and device A 802 and device G 1502 have an established peer to peer connection. Further consider that device A 802 desires to receive peer to peer traffic signals from device B 804 and device G 1502 concurrently. Device A 802 generates receiver interference estimates. Based on the generated receiver interference estimates, device A 802 selects antenna 1 814 for the device B transmission reception, as indicted by box 1504, and device A selects antenna 2 816 for device G transmission reception as indicated by box 1506.

Device B 804 transmits peer to peer traffic signal 1508 to device A 802. Device A 802 receives peer to peer traffic signal 1508 via its selected antenna which is antenna 1 814. Device G 1502 transmits peer to peer traffic signal 1510 to device A 802. Device A 802 receives peer to peer traffic signal 1510 via its selected antenna which is antenna 2 816. Device C 806 transmits peer to peer traffic signal 1512 to device D 808. Device E 810 transmits peer to peer traffic signal 1514 to device F 812. In some embodiments, the peer to peer traffic signals (1508, 1510, 1512, 1514) are transmitted concurrently on the same air link resources, e.g., the same set of time-frequency transmission units. Device A 802 separately recovers information from the signals (1508, 1510) received from device B 804 using (antenna 1 814, antenna 2 816), respectively.

Although device A 802 has been shown with two antennas, in some embodiments device A 802 includes more than two antennas. For example, in some embodiments device A 802 includes four or more antennas. In one such embodiment, at times, device A 802 may, and sometimes does, select a first antenna for receiving from device B 802, a second antenna for receiving from device G 1502, a third antenna for transmitting to device B 804, and a fourth antenna for transmitting to device G 1502.

The techniques of various embodiments may be implemented using software, hardware and/or a combination of software and hardware. In some embodiments, modules are implemented as physical modules. In some such embodiments, the individual physical modules are implemented in hardware, e.g., as circuits, or include hardware, e.g., circuits, with some software. In other embodiments, the modules are implemented as software modules which are stored in memory and executed by a processor, e.g., general purpose computer. Various embodiments are directed to apparatus, e.g., stationary wireless nodes, mobile nodes such as mobile access terminals of which cell phones are but one example, access point such as base stations including one or more attachment points, servers, and/or communications systems. Various embodiments are also directed to methods, e.g., method of controlling and/or operating wireless communications devices including mobile and/or stationary nodes, access points such as base stations, server nodes and/or communications systems, e.g., hosts. Various embodiments are also directed to machine, e.g., computer, readable medium, e.g., ROM, RAM, CDs, hard discs, etc., which include machine readable instructions for controlling a machine to implement one or more steps of a method.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In various embodiments nodes described herein are implemented using one or more modules to perform the steps corresponding to one or more methods, for example, generating receiver interference estimates for each of a plurality of antennas; selecting one of the plurality of antennas for receiving signals from a second communications device as a function of the receiver interference estimates; generating transmitter interference estimates for each of the plurality of antennas, the transmitter interference estimates estimating the interference to other devices which will be caused by transmission to the second communications device from the antenna to which the estimate corresponds; and selecting one of the plurality of antennas for transmitting signals to the second communications device as a function of one of the transmitter interference estimates.

Thus, in some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium including machine executable instructions for causing a machine, e.g., processor and associated hardware, to perform one or more of the steps of the above-described method(s). Some embodiments are directed to a device, e.g., communications device, including a processor configured to implement one, multiple or all of the steps of one or more methods of the invention.

Some embodiments are directed to a computer program product comprising a computer-readable medium comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a communications device or node. The code may be in the form of machine, e.g., computer, executable instructions stored on a computer-readable medium such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device or other device described in the present application.

In some embodiments, the processor or processors, e.g., CPUs, of one or more devices, e.g., communications devices such as wireless terminals are configured to perform the steps of the methods described as being performed by the communications device. Accordingly, some but not all embodiments are directed to a device, e.g., communications device, with a processor which includes a module corresponding to each of the steps of the various described methods performed by the device in which the processor is included. In some but not all embodiments a device, e.g., communications device, includes a module corresponding to each of the steps of the various described methods performed by the device in which the processor is included. The modules may be implemented using software and/or hardware.

While various features are described in the context of an OFDM system, at least some of the methods and apparatus of various embodiments are applicable to a wide range of communications systems including many non-OFDM and/or non-cellular systems.

Numerous additional variations on the methods and apparatus of the various embodiments described above will be apparent to those skilled in the art in view of the above description. Such variations are to be considered within the scope. The methods and apparatus may be, and in various embodiments are, used with CDMA, orthogonal frequency division multiplexing (OFDM), GSM and/or various other types of communications techniques which may be used to provide wireless communications links, e.g., WAN wireless communications links, between access points and wireless communications device such as mobile nodes and wireless communications. The methods and apparatus may be, and in various embodiments are, used with CDMA, orthogonal frequency division multiplexing (OFDM), GSM and/or various other types of communications techniques which may be used to provide wireless communications links, e.g., direct peer to peer wireless communications links, between wireless communications devices including peer to peer interfaces. In some embodiments a wireless communications device including both a wide area network interface and a peer to peer network interface uses different communications techniques for the different interfaces, e.g., one of CDMA and GSM based techniques for the WAN interface and OFDM based techniques for the peer to peer interface. In some embodiments the access points are implemented as base stations which establish communications links with mobile nodes using CDMA, GSM and/or OFDM. In various embodiments the mobile nodes are implemented as notebook computers, personal data assistants (PDAs), or other portable devices including receiver/transmitter circuits and logic and/or routines, for implementing the methods.

What is claimed is:

1. A method of operating a first communications device, the method comprising:

generating receiver interference estimates, said receiver interference estimates including a receiver interference estimate for each of a plurality of antennas;

selecting one of the plurality of antennas for receiving signals from a second communications device as a function of the receiver interference estimates;

generating transmitter interference estimates, said transmitter interference estimates including a transmitter interference estimate for each of the plurality of antennas, the transmitter interference estimates estimating the interference to another device which will be caused by transmission to the second communications device from the antenna to which the estimate corresponds, said another device being a third device which is a different device than said first communications device and said second communications device; and selecting one of the plurality of antennas for transmitting signals to the second communications device as a function of one of the transmitter interference estimates.

2. The method of claim 1, further comprising:

receiving a signal from the second communications device; and wherein at least one of the generated receiver interference estimates is generated based on the signal received from the second communications device.

3. The method of claim 2, wherein each of the plurality of antennas is located at a physical location which is separated from the other ones of said plurality of antennas.

4. The method of claim 2, wherein each of the plurality of antennas is pointed in a different direction from each of the other ones of said plurality of antennas.

5. The method of claim 2, wherein the transmitter interference estimates are based on at least one signal received from the third device which will be subject to interference due to transmission from the first communications device to the second communications device.

6. The method of claim 2, wherein a different antenna is selected for receiving signals from the second communications device than for transmitting signals to the second communications device.

7. The method of claim 2, wherein said selecting includes selecting a first antenna for receiving signals from the second communications device.

8. The method of claim 7, further comprising:

selecting a second antenna for receiving signals from a fourth communications device, said fourth communications device being a different device from said first communications device, second communications device and third device;

receiving signals from the second communications device using said first antenna while receiving signals from the fourth communications device using the second antenna; and separately recovering information from the signals received from the second and fourth communications devices using the first and second antennas.

9. The method of claim 8, wherein said signals which are received from the second and fourth communications devices using the first and second antennas, respectively, are signals which use the same communications resource.

10. The method of claim 1, wherein said first communications device and said third device are peer to peer communications devices.

11. The method of claim 1, further comprising:

receiving a signal from said third device; and wherein said step of generating transmitter interference estimates for each of the plurality of antennas includes generating said transmitter interference estimates based on at least said signal from said third device.

12. The method of claim 11, wherein said signal from said third device is a transmission request signal directed by said third device to a fourth device with which said third device is seeking to communicate, said fourth device being a different device from said first communications device, said second communications device and said third device.

13. A first communications device comprising:
means for generating receiver interference estimates, said receiver interference estimates including a receiver interference estimate for each of a plurality of antennas;
means for selecting one of the plurality of antennas for receiving signals from a second communications device as a function of the receiver interference estimates;
means for generating transmitter interference estimates, said transmitter interference estimates including a transmitter interference estimate for each of the plurality of antennas, the transmitter interference estimates estimating the interference to another device which will be caused by transmission to the second communications device from the antenna to which the estimate corresponds, said another device being a third device which is a different device than said first communications device and said second communications device; and
means for selecting one of the plurality of antennas for transmitting signals to the second communications device as a function of one of the transmitter interference estimates.

14. The first communications device of claim 13, further comprising:
means for receiving a signal from said second communications device; and
wherein at least one of the generated receiver interference estimates is generated by said means for generating receiver interference estimates based on the signal received from the second communications device.

15. The first communications device of claim 14, wherein each of the plurality of antennas is located at a physical location which is separated from the other ones of said plurality of antennas.

16. The first communications device of claim 14, wherein each of the plurality of antennas is pointed in a different direction from each of the other ones of said plurality of antennas.

17. The first communications device of claim 14, wherein the transmitter interference estimates are based on at least one signal received from said third device which will be subject to interference due to transmission from the first communications device to the second communications device.

18. A non-transitory computer program product for use in a first communications device, the non-transitory computer program product comprising:
a non-transitory computer readable medium comprising:
code for causing at least one computer to generate receiver interference estimates, said receiver interference estimates including a receiver interference estimate for each of a plurality of antennas;
code for causing said at least one computer to select one of the plurality of antennas for receiving signals from a second communications device as a function of the receiver interference estimates;
code for causing said at least one computer to generate transmitter interference estimates, said transmitter interference estimates including a transmitter interference estimate for each of the plurality of antennas, the transmitter interference estimates estimating the interference to another device which will be caused by transmission to the second communications device from the antenna to which the estimate corresponds, said another device being a third device which is a different device than said first communications device and said second communications device; and
code for causing said at least one computer to select one of the plurality of antennas for transmitting signals to the second communications device as a function of one of the transmitter interference estimates.

19. A first communications device comprising:
at least one processor configured to:
generate receiver interference estimates, said receiver interference estimates including a receiver interference estimate for each of a plurality of antennas;
select one of the plurality of antennas for receiving signals from a second communications device as a function of the receiver interference estimates;
generate transmitter interference estimates, said transmitter interference estimates including a transmitter interference estimate for each of the plurality of antennas, the transmitter interference estimates estimating the interference to another device which will be caused by transmission to the second communications device from the antenna to which the estimate corresponds, said another device being a third device which is a different device than said first communications device and said second communications device; and
select one of the plurality of antennas for transmitting signals to the second communications device as a function of one of the transmitter interference estimates; and
memory coupled to said at least one processor.

20. The first communications device of claim 19, wherein said at least one processor is further configured to:
receive a signal from said second communications device; and
generate at least one of the receiver interference estimates based on the signal received from the second communications device.

21. The first communications device of claim 20, wherein each of the plurality of antennas is located at a physical location which is separated from the other ones of said plurality of antennas.

22. The first communications device of claim 20, wherein each of the plurality of antennas is pointed in a different direction from each of the other ones of said plurality of antennas.

23. The first communications device of claim 20, wherein said at least one processor is configured to base the transmitter interference estimates on at least one signal received from the third device, which will be subject to interference due to transmission from the first communications device to the second communications device.

* * * * *